US012243499B2

(12) United States Patent
Choi et al.

(10) Patent No.: US 12,243,499 B2
(45) Date of Patent: Mar. 4, 2025

(54) GATE DRIVING CIRCUIT AND DISPLAY DEVICE

(71) Applicant: LG DISPLAY CO., LTD., Seoul (KR)

(72) Inventors: Youngjun Choi, Incheon (KR); Sojung Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/386,179

(22) Filed: Nov. 1, 2023

(65) Prior Publication Data

US 2024/0203375 A1 Jun. 20, 2024

(30) Foreign Application Priority Data

Dec. 16, 2022 (KR) ........................ 10-2022-0176508

(51) Int. Cl.
*G09G 3/36* (2006.01)
*G09G 3/32* (2016.01)
*G09G 3/3266* (2016.01)

(52) U.S. Cl.
CPC ............. *G09G 3/3677* (2013.01); *G09G 3/32* (2013.01); *G09G 3/3266* (2013.01); *G09G 2300/0426* (2013.01); *G09G 2310/0267* (2013.01); *G09G 2310/0291* (2013.01); *G09G 2320/0295* (2013.01)

(58) Field of Classification Search
CPC ...... G09G 3/3677; G09G 3/32; G09G 3/3266; G09G 2300/0426; G09G 2310/0267; G09G 2310/0261; G09G 2320/0295
See application file for complete search history.

(56) References Cited

U.S. PATENT DOCUMENTS

2014/0085285 A1* 3/2014 Kim ....................... G11C 19/28
377/67

* cited by examiner

*Primary Examiner* — Lisa S Landis
(74) *Attorney, Agent, or Firm* — Morgan, Lewis & Bockius LLP

(57) ABSTRACT

The present disclosure provides a gate driving circuit and a display device. An nth stage circuit among a plurality of stage circuits included in a gate driving circuit according to embodiments of the disclosure may include a scan output buffer circuit configured to output a scan signal according to voltages of a Q node and a Qb node, a control circuit including a plurality of transistors to control the voltages of the Q node and the Qb node, the plurality of transistors including a first Q node discharge transistor turned on or off by the voltage of the Qb node to control connection between the Q node and a low-potential voltage node, and a body bias circuit configured to supply a body bias voltage to a body of a first Q node discharge transistor.

20 Claims, 16 Drawing Sheets

GATE DRIVING CIRCUIT AND DISPLAY DEVICE

CROSS-REFERENCE TO RELATED APPLICATION

This application claims priority from Korean Patent Application No. 10-2022-0176508, filed on Dec. 16, 2022, which is hereby incorporated by reference for all purposes as if fully set forth herein.

BACKGROUND

Technical Field

Embodiments of the disclosure relate to a gate driving circuit and a display device.

Discussion of the Related Art

As the information society develops, demand for display devices for displaying images is increasing in various forms. Various display devices, such as liquid crystal display devices and organic light emitting display devices, are being utilized in recent years.

To display an image, a display device may include a display panel on which a plurality of data lines and a plurality of gate lines are disposed, and a display driving circuit for driving the display panel. The display driving circuit may include a data driving circuit outputting data signals to a plurality of data lines and a gate driving circuit outputting gate signals to a plurality of gate lines.

The gate driving circuit of the display driving circuit is composed of a large number of transistors. It ends up the gate driving circuit being complicated and having an increased circuit area.

Further, if some of the many transistors included in the gate driving circuit operate abnormally, the entire gate driving circuit may malfunction, causing image artifacts on the display panel.

SUMMARY

Accordingly, embodiments of the present disclosure are directed to a gate driving circuit and a display device that substantially obviate one or more of the problems due to limitations and disadvantages of the related art.

An aspect of the present disclosure is to provide a gate driving circuit and a display device having a simplified structure.

Another aspect of the present disclosure is to provide a gate driving circuit and a display device capable of normally operating by blocking leakage current of a transistor even when a threshold voltage of a transistor included in the gate driving circuit changes in a negative direction.

Another aspect of the present disclosure is to provide a gate driving circuit and a display device capable of generating and outputting a normal scan signal even when characteristics of transistors included in the gate driving circuit are changed.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a gate driving circuit may comprise a plurality of stage circuits for outputting a plurality of scan signals.

An nth stage circuit among the plurality of stage circuits may include a scan output buffer circuit configured to receive a scan clock signal from a scan clock node, receive a low-potential voltage from a low-potential voltage node, and output a scan signal including a first signal section having a turn-off level voltage and a second signal section having a turn-on level voltage according to voltages of a Q node and a Qb node, a control circuit including a plurality of transistors to control the voltages of the Q node and the Qb node to control an operation of the scan output buffer circuit, the plurality of transistors including a first Q node discharge transistor turned on or off by the voltage of the Qb node to control connection between the Q node and the low-potential voltage node, and a body bias circuit configured to supply a body bias voltage to a body of the first Q node discharge transistor.

A voltage level of the body bias voltage may change according to a state of the first Q node discharge transistor. During a period when the first Q node discharge transistor is to be turned off, the body bias voltage may have a first voltage level. During a period when the first Q node discharge transistor is to be turned on, the body bias voltage may have a second voltage level different from the first voltage level.

The first voltage level may be lower than the second voltage level, and the first voltage level may be lower than the low-potential voltage.

A voltage level change pattern of the body bias voltage may correspond to a voltage level change pattern of the Qb node. When the Qb node has a low level voltage, the body bias voltage may have a first voltage level. When the Qb node has a high level voltage, the body bias voltage may have a second voltage level different from the first voltage level.

The body bias voltage may have a voltage level that varies depending on an operating state of the scan output buffer circuit.

When the scan signal output from the scan output buffer circuit is the second signal section having the turn-on level voltage, the body bias voltage may have a first voltage level. When the scan signal output from the scan output buffer circuit is the first signal section having the turn-off level voltage, the body bias voltage may have a second voltage level different from the first voltage level.

The body bias circuit may include a first bias capacitor connected between a body of the first Q node discharge transistor and a global low-potential voltage node to which a global low-potential voltage is applied and a second bias capacitor connected between the body of the first Q node discharge transistor and the Qb node.

The second bias capacitor may have a larger capacitance than the first bias capacitor.

The global low-potential voltage may be lower than the low-potential voltage.

In another aspect, a display device may comprise a substrate, a plurality of subpixels disposed on the substrate, a plurality of scan signal lines connected to the plurality of subpixels, and a gate driving circuit connected to the plurality of scan signal lines.

The gate driving circuit may include a plurality of stage circuits.

An nth stage circuit among the plurality of stage circuits may include a scan output buffer circuit configured to receive a scan clock signal from a scan clock node, receive a low-potential voltage from a low-potential voltage node, and output a scan signal including a first signal section having a turn-off level voltage and a second signal section having a turn-on level voltage according to voltages of a Q node and a Qb node, a control circuit including a plurality of transistors to control the voltages of the Q node and the Qb node to control an operation of the scan output buffer circuit, the plurality of transistors including a first Q node discharge transistor turned on or off by the voltage of the Qb node to control connection between the Q node and the low-potential voltage node, and a body bias circuit configured to supply a body bias voltage to a body of the first Q node discharge transistor.

A voltage level of the body bias voltage may change according to a state of the first Q node discharge transistor.

The body bias voltage may change according to the voltage level of the Qb node.

According to embodiments of the disclosure, there may be provided a gate driving circuit and a display device having a simplified structure.

According to embodiments of the disclosure, there may be provided a gate driving circuit and a display device capable of normally operating by blocking leakage current of a transistor even when a threshold voltage of a transistor included in the gate driving circuit changes in a negative direction.

According to embodiments of the disclosure, there may be provided a gate driving circuit and a display device capable of generating and outputting a normal scan signal even when characteristics of transistors included in the gate driving circuit are changed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
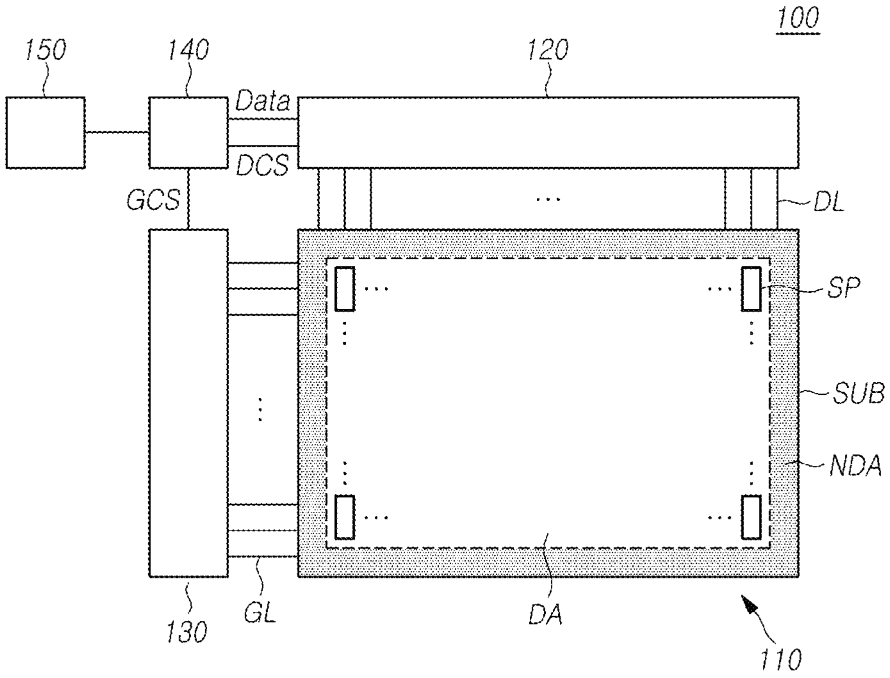
FIG. 1 is a view illustrating a system configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “A”, or “B” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1 is a view illustrating a configuration of a display device 100 according to embodiments of the disclosure.

Referring to FIG. 1, a display device 100 according to embodiments of the disclosure may include a display panel 110 and driving circuits for driving the display panel 110.

The driving circuits may include a data driving circuit 120 and a gate driving circuit 130. The display device 100 may further include a controller 140 controlling the data driving circuit 120 and the gate driving circuit 130.

The display panel 110 may include a substrate SUB and signal lines, such as a plurality of data lines DL and a plurality of gate lines GL disposed on the substrate SUB. The display panel 110 may include a plurality of subpixels SP connected to the plurality of data lines DL and the plurality of gate lines GL.

The display panel 110 may include a display area DA in which images are displayed and a non-display area NDA in which no image is displayed. In the display panel 110, a plurality of subpixels SP for displaying images may be disposed in the display area DA, and the driving circuits 120, 130, and 140 may be electrically connected or disposed in the non-display area NDA. Further, pad units for connection of integrated circuits or a printed circuit may be disposed in the non-display area NA.

The data driving circuit 120 is a circuit for driving the plurality of data lines DL, and may supply data signals to the plurality of data lines DL. The gate driving circuit 130 is a circuit for driving the plurality of gate lines GL, and may supply gate signals to the plurality of gate lines GL. The controller 140 may supply a data control signal DCS to the data driving circuit 120 to control the operation timing of the data driving circuit 120. The controller 140 may supply a gate control signal GCS for controlling the operation timing of the gate driving circuit 130 to the gate driving circuit 130.

The controller 140 may start scanning according to a timing implemented in each frame, convert input image data input from the outside into image data Data suited for the data signal format used in the data driving circuit 120, supply the image data Data to the data driving circuit 120, and control data driving at an appropriate time suited for scanning.

The controller 140 receives, from the outside (e.g., a host system 150), various timing signals including a vertical synchronization signal VSYNC, a horizontal synchronization signal HSYNC, an input data enable signal DE, and a clock signal, along with the input image data.

To control the data driving circuit 120 and the gate driving circuit 130, the controller 140 receives timing signals, such as the vertical synchronization signal VSYNC, horizontal synchronization signal HSYNC, input data enable signal DE, and clock signal CLK, generates various control signals DCS and GCS, and outputs the control signals to the data driving circuit 120 and the gate driving circuit 130.

As an example, to control the gate driving circuit 130, the controller 140 outputs various gate control signals GCS including a gate start pulse GSP, a gate shift clock GSC, and a gate output enable signal (Gate Output Enable, GOE).

To control the data driving circuit 120, the controller 140 outputs various data control signals DCS including, e.g., a source start pulse SSP, a source sampling clock SSC, and a source output enable signal (Source Output Enable, SOE).

The controller 140 may be implemented as a separate component from the data driving circuit 120, or the controller 140, along with the data driving circuit 120, may be implemented as an integrated circuit.

The data driving circuit 120 receives the image data Data from the controller 140 and supply data voltages to the plurality of data lines DL, thereby driving the plurality of data lines DL. The data driving circuit 120 is also referred to as a 'source driving circuit.'

The data driving circuit 120 may include one or more source driver integrated circuit (SDICs).

Each source driver integrated circuit (SDIC) may include a shift register, a latch circuit, a digital-to-analog converter (DAC), and an output buffer. In some cases, each source driver integrated circuit (SDIC) may further include an analog-digital converter ADC.

For example, each source driver integrated circuit (SDIC) may be connected with the display panel 110 by a tape automated bonding (TAB) method or connected to a bonding pad of the display panel 110 by a chip on glass (COG) or chip on panel (COP) method or may be implemented by a chip on film (COF) method and connected with the display panel 110.

The gate driving circuit 130 may output a gate signal of a turn-on level voltage or a gate signal of a turn-off level voltage according to the control of the controller 140. The gate driving circuit 130 may sequentially drive the plurality of gate lines GL by sequentially supplying gate signals of the turn-on level voltage to the plurality of gate lines GL.

The gate driving circuit 130 may be connected with the display panel 110 by TAB method or connected to a bonding pad of the display panel 110 by a COG or COP method or may be connected with the display panel 110 according to a COF method. Alternatively, the gate driving circuit 130 may be formed in a gate in panel (GIP) type, in the non-display area NDA of the display panel 110. The gate driving circuit 130 may be disposed on the substrate SUB or may be connected to the substrate SUB. In other words, the gate driving circuit 130 that is of a GIP type may be disposed in the non-display area NDA of the substrate SUB. The gate driving circuit 130 that is of a chip-on-glass (COG) type or chip-on-film (COF) type may be connected to the substrate SUB.

Meanwhile, at least one of the data driving circuit 120 and the gate driving circuit 130 may be disposed in the display area DA. For example, at least one of the data driving circuit 120 and the gate driving circuit 130 may be disposed not to overlap the subpixels SP or to overlap all or some of the subpixels SP.

When a specific gate line GL is opened by the gate driving circuit 130, the data driving circuit 120 may convert the image data Data received from the controller 140 into an analog data voltage and supply it to the plurality of data lines DL.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The controller 140 may be a timing controller used in typical display technology, a control device that may perform other control functions as well as the functions of the timing controller, or a control device other than the timing controller, or may be a circuit in the control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit.

The controller 140 may transmit/receive signals to/from the data driving circuit 120 according to one or more predetermined interfaces. The interface may include, e.g., a low voltage differential signaling (LVDS) interface, an embedded clock point to point interface (EPI), and a serial peripheral interface (SPI).

The controller 140 may include a storage medium, such as one or more registers.

The display device 100 according to embodiments of the disclosure may be a display including a backlight unit, such as a liquid crystal display, or may be a self-emission display, such as an organic light emitting diode (OLED) display, a quantum dot display, or a micro light emitting diode (LED) display.

If the display device 100 according to embodiments of the disclosure is an OLED display, each subpixel SP may include an organic light emitting diode (OLED), which by itself emits light, as the light emitting element. If the display device 100 according to embodiments of the disclosure is a quantum dot display, each subpixel SP may include a light emitting element formed of a quantum dot, which is a self-luminous semiconductor crystal. If the display device 100 according to embodiments of the disclosure is a micro LED display, each subpixel SP may include a micro LED, which is self-emissive and formed of an inorganic material, as the light emitting element.

Figure 2A:
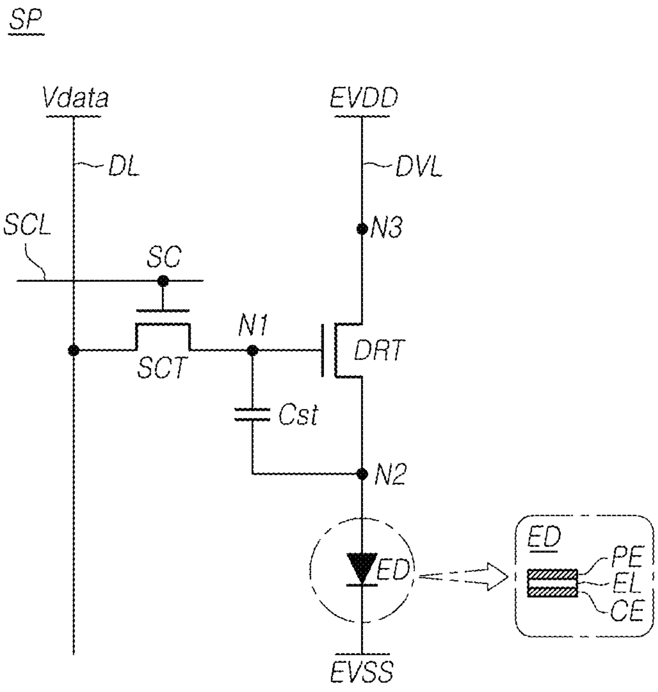
FIGS. 2A and 2B are equivalent circuit diagrams illustrating a subpixel of a display device according to embodiments of the disclosure.
Figure 2B:
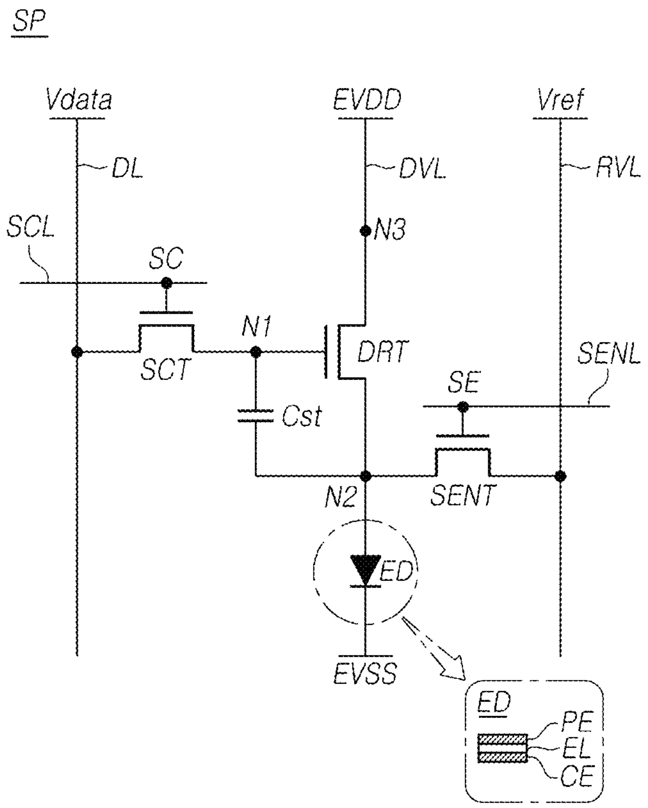

FIGS. 2A and 2B equivalent are circuit diagrams illustrating a subpixel SP of a display device 100 according to embodiments of the disclosure.

Referring to FIG. 2A, each of a plurality of subpixels SP disposed on a display panel 110 of a display device 100 according to embodiments of the disclosure may include a light emitting element ED, a driving transistor DRT, a scan transistor SCT, and a storage capacitor Cst.

Referring to FIG. 2A, the light emitting element ED may include a pixel electrode PE and a common electrode CE and may include a light emitting layer EL positioned between the pixel electrode PE and the common electrode CE. A base voltage EVSS may be applied to the common electrode CE of the light emitting element ED.

The pixel electrode PE of the light emitting element ED may be an electrode disposed in each subpixel SP, and the common electrode CE may be an electrode commonly disposed in all the subpixels SP. Here, the pixel electrode PE may be an anode electrode, and the common electrode CE may be a cathode electrode. Conversely, the pixel electrode PE may be a cathode electrode, and the common electrode CE may be an anode electrode.

For example, the light emitting element ED may be an organic light emitting diode (OLED), an inorganic material-based light emitting diode (LED), or a quantum dot light emitting element.

The driving transistor DRT is a transistor for driving the light emitting element ED, and may include a first node N1, a second node N2, and a third node N3.

The first node N1 of the driving transistor DRT may be a gate node of the driving transistor DRT, and may be electrically connected with a source node or a drain node of the scan transistor SCT. The second node N2 of the driving transistor DRT may be a source node or a drain node of the driving transistor DRT, and may be electrically connected with a source node or a drain node of the sensing transistor SENT and may also be electrically connected with the pixel electrode PE of the light emitting element ED. The third node N3 of the driving transistor DRT may be electrically connected with a driving voltage line DVL supplying a driving voltage EVDD.

The scan transistor SCT may be controlled by a scan signal SC, which is a type of gate signal, and may be connected between the first node N1 of the driving transistor DRT and the data line DL. In other words, the scan transistor SCT may be turned on or off according to the scan signal SC supplied from the scan signal line SCL, which is a type of the gate line GL, controlling the connection between the data line DL and the first node N1 of the driving transistor DRT.

The scan transistor SCT may be turned on by the scan signal SC having a turn-on level voltage and transfer the data voltage Vdata supplied from the data line DL to the first node N1 of the driving transistor DRT.

If the scan transistor SCT is an n-type transistor, the turn-on level voltage of the scan signal SC may be a high level voltage. If the scan transistor SCT is a p-type transistor, the turn-on level voltage of the scan signal SC may be a low level voltage.

The storage capacitor Cst may be electrically connected between the first node N1 and second node N2 of the driving transistor DRT. The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP may emit light.

Referring to FIG. 2B, each of the plurality of subpixels SP disposed on the display panel 110 of the display device 100 according to embodiments of the disclosure may further include a sensing transistor SENT.

The sensing transistor SENT may be controlled by a sensing signal SE, which is a type of gate signal, and may be connected between the second node N2 of the driving transistor DRT and the reference voltage line RVL. In other words, the sensing transistor SENT may be turned on or off according to the sensing signal SE supplied from the sensing signal line SENL, which is another type of the gate line GL, controlling the connection between the reference voltage line RVL and the second node N2 of the driving transistor DRT.

The sensing transistor SENT may be turned on by the sensing signal SE having a turn-on level voltage and transfer a reference voltage Vref supplied from the reference voltage line RVL to the second node N2 of the driving transistor DRT.

The sensing transistor SENT may be turned on by the sensing signal SE having a turn-on level voltage, transferring the voltage of the second node N2 of the driving transistor DRT to the reference voltage line RVL.

If the sensing transistor SENT is an n-type transistor, the turn-on level voltage of the sensing signal SE may be a high level voltage. If the sensing transistor SENT is a p-type transistor, the turn-on level voltage of the sensing signal SE may be a low level voltage.

The function in which the sensing transistor SENT transfers the voltage of the second node N2 of the driving transistor DRT to the reference voltage line RVL may be used upon driving to sense the characteristic value of the subpixel SP. In this case, the voltage transferred to the reference voltage line RVL may be a voltage for calculating the characteristic value of the subpixel SP or a voltage reflecting the characteristic value of the subpixel SP.

In the disclosure, the characteristic value of the subpixel SP may be a characteristic value of the driving transistor DRT or the light emitting element ED. The characteristic value of the driving transistor DRT may include a threshold voltage and mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor or a p-type transistor. In the disclosure, for convenience of description, each of the driving transistor DRT, the scan transistor SCT, and the sensing transistor SENT is an n-type transistor.

The storage capacitor Cst is not a parasitic capacitor (e.g., Cgs or Cgd) which is an internal capacitor existing between the gate node and the source node (or drain node) of the driving transistor DRT, but may be an external capacitor intentionally designed outside the driving transistor DRT.

The scan signal line SCL and the sensing signal line SENL may be different gate lines GL. In this case, the scan signal SC and the sensing signal SE may be separate gate signals, and the on-off timings of the scan transistor SCT and the on-off timings of the sensing transistor SENT in one subpixel SP may be independent. In other words, the on-off timings of the scan transistor SCT and the on-off timings of the sensing transistor SENT in one subpixel SP may be the same or different.

Alternatively, the scan signal line SCL and the sensing signal line SENL may be the same gate line GL. In other words, the gate node of the scan transistor SCT and the gate node of the sensing transistor SENT in one subpixel SP may be connected with one gate line GL. In this case, the scan signal SC and the sensing signal SE may be the same gate signals, and the on-off timings of the scan transistor SCT and the on-off timings of the sensing transistor SENT in one subpixel SP may be the same.

The structures of the subpixel SP shown in FIGS. 2A and 2B are merely examples, and various changes may be made thereto, e.g., such as including one or more transistors or one or more capacitors.

Although the subpixel structure is described in connection with FIGS. 2A and 2B under the assumption that the display device 100 is a self-emission display device, if the display device 100 is a liquid crystal display, each subpixel SP may include a transistor and a pixel electrode.

Figure 3:
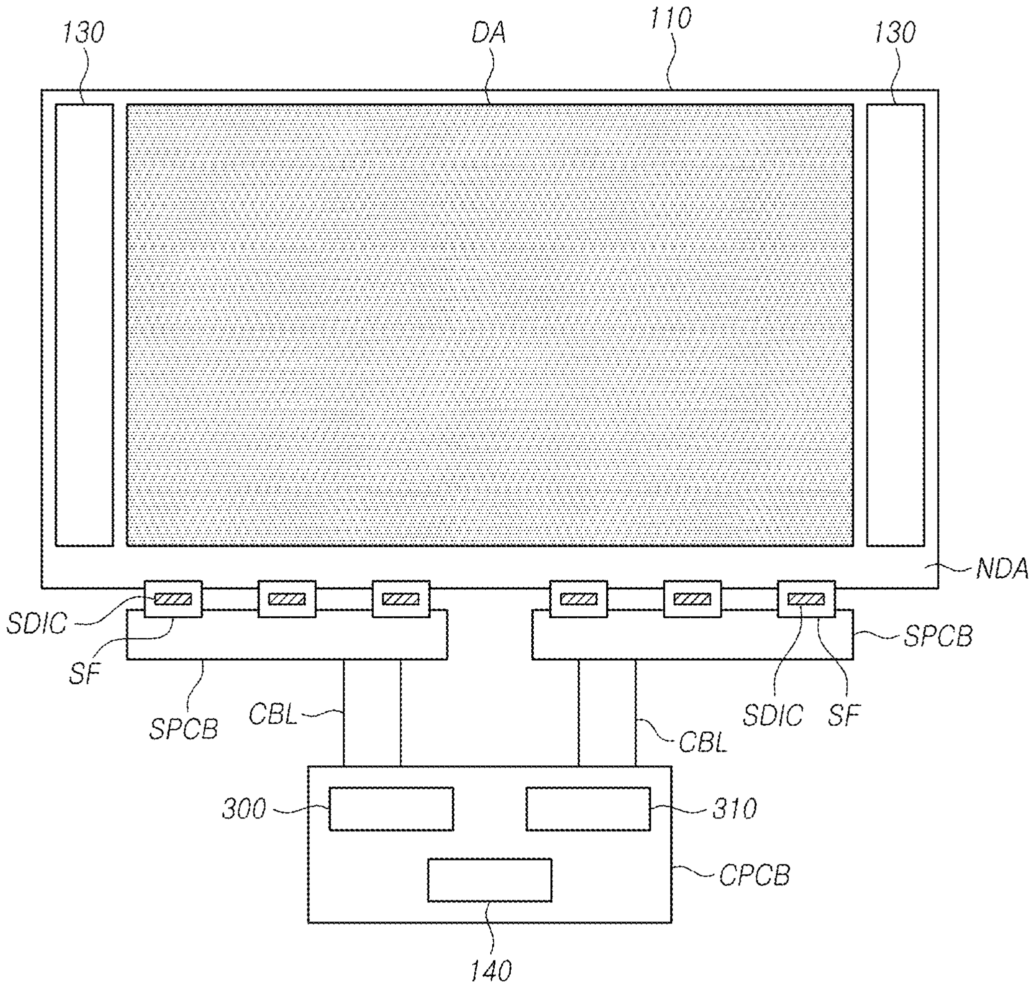
FIG. 3 is a view illustrating an example system configuration of a display device according to embodiments of the disclosure.

FIG. 3 illustrates an example system configuration of a display device 100 according to embodiments of the disclosure.

Referring to FIG. 3, the display panel 110 may include a display area DA in which images are displayed and a non-display area NDA in which no image is displayed.

Referring to FIG. 3, when a data driving circuit 120 includes one or more source driver integrated circuits SDIC and is implemented in a chip-on-film (COF) type, each source driver integrated circuit SDIC may be mounted on a circuit film SF connected to the non-display area NDA of the display panel 110.

Referring to FIG. 3, a gate driving circuit 130 may be implemented in a gate in panel (GIP) type. In this case, the gate driving circuit 130 may be formed in the non-display area NDA of the display panel 110. Unlike FIG. 3, the gate driving circuit 130 may be implemented in a chip on film (COF) type.

The display device 100 may include at least one source printed circuit board SPCB for circuit connection between one or more source driver integrated circuits SDIC and other devices and a control printed circuit board CPCB for mounting control components and various electric devices.

The source driver integrated circuit SDIC-packed film SF may be connected to at least one source printed circuit board SPCB. In other words, one side of the source driver integrated circuit SDIC-packed film SF may be electrically connected with the display panel 110, and the opposite side thereof may be electrically connected with the source printed circuit board SPCB.

A controller 140 and a power management integrated circuit (PMIC) 310 may be mounted on the control printed circuit board CPCB. The controller 140 may perform overall control functions related to driving of the display panel 110, and may control operations of the data driving circuit 120 and the gate driving circuit 130. The power management integrated circuit 310 may supply various voltages or currents to the data driving circuit 120 and the gate driving circuit 130 or may control various voltages or currents to be supplied thereto.

At least one source printed circuit board SPCB and the control printed circuit board CPCB may be circuit-connected through at least one connection cable CBL. Here, the connection cable CBL may be, e.g., a flexible printed circuit (FPC) or a flexible flat cable (FFC).

At least one source printed circuit board SPCB and control printed circuit board CPCB may be integrated into one printed circuit board.

The display device 100 according to embodiments of the disclosure may further include a level shifter 300 for adjusting a voltage level. For example, the level shifter 300 may be disposed on a control printed circuit board CPCB or a source printed circuit board SPCB.

In particular, in the display device 100 according to embodiments of the disclosure, the level shifter 300 may supply signals necessary for gate driving to the gate driving circuit 130. For example, the level shifter 300 may supply a plurality of clock signals to the gate driving circuit 130. Accordingly, the gate driving circuit 130 may output the plurality of gate signals to the plurality of gate lines GL based on the plurality of clock signals input from the level shifter 300. The plurality of gate lines GL may transfer the plurality of gate signals to the subpixels SP disposed in the display area DA of the substrate SUB.

Figure 4:
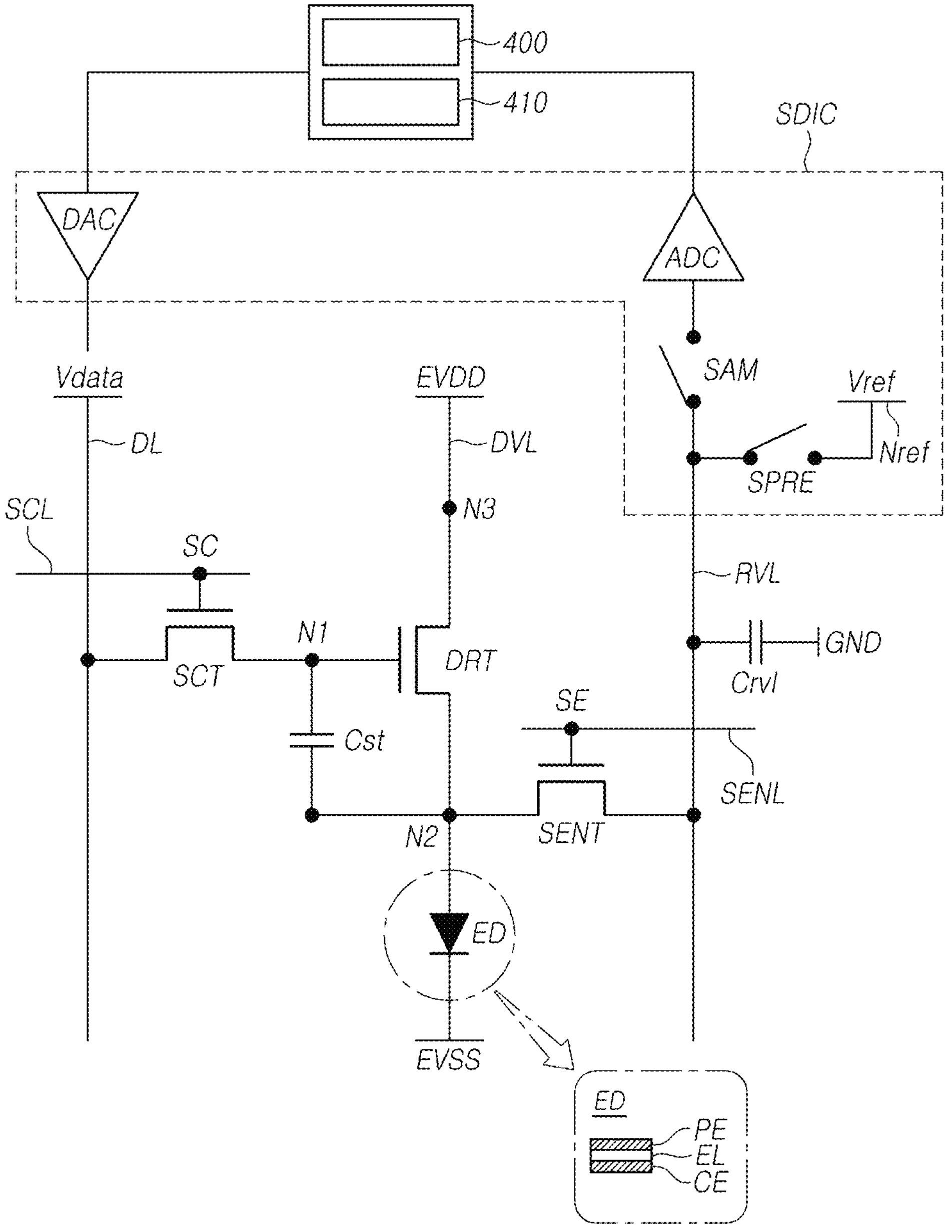
FIG. 4 is a view illustrating a compensation circuit of a display device according to embodiments of the disclosure.

FIG. 4 is a view illustrating a compensation circuit of a display device 100 according to embodiments of the disclosure.

Referring to FIG. 4, the compensation circuit is a circuit capable of sensing and compensation processing on characteristic values of circuit elements in the subpixel SP.

The compensation circuit may be connected to the subpixel SP and may include a power switch SPRE, a sampling switch SAM, an analog-to-digital converter ADC, and a compensator 400.

The power switch SPRE may control the connection between the reference voltage line RVL and the reference voltage supply node Nref. The reference voltage Vref output from the power supply may be supplied to the reference voltage supply node Nref, and the reference voltage Vref supplied to the reference voltage supply node Nref may be applied to the reference voltage line RVL through the power switch SPRE.

The sampling switch SAM may control a connection between the analog-to-digital converter ADC and the reference voltage line RVL. If connected to the reference voltage line RVL by the sampling switch SAM, the analog-to-digital converter ADC may convert the voltage (analog voltage) of the connected reference voltage line RVL into a sensing value corresponding to a digital value.

A line capacitor Crvl may be formed between the reference voltage line RLV and the ground GND. The voltage of the reference voltage line RVL may correspond to the charge amount of the line capacitor Crvl.

The analog-to-digital converter ADC may provide sensing data including a sensing value to the compensator 400.

The compensator 400 may find out the characteristic value of the light emitting element ED or the driving transistor DRT included in the corresponding subpixel SP based on the sensing data, calculate a compensation value, and store it in the memory 410.

For example, the compensation value is information for reducing a deviation in characteristic value between the light emitting elements ED or a deviation in characteristic value between the driving transistors DRT and may include an offset and a gain value for data change.

The display controller 140 may change the image data using the compensation value stored in the memory 410 and may supply the changed image data to the data driving circuit 120.

The data driving circuit 120 may convert the changed image data into a data voltage Vdata corresponding to the analog voltage using the digital-to-analog converter DAC and output the data voltage Vdata. Accordingly, compensation may be realized.

Referring to FIG. 4, the analog-to-digital converter ADC, the power switch SPRE, and the sampling h SAM may be included in the source driver integrated circuit SDIC included in the data driving circuit 120. The compensator 400 may be included in the display controller 140.

As described above, the display device 100 according to embodiments of the disclosure may perform compensation processing to reduce a deviation in characteristic value between the driving transistors DRT. To perform compensation processing, the display device 100 may perform sensing driving to detect the deviation in characteristic value between the driving transistors DRT.

Figure 5A:
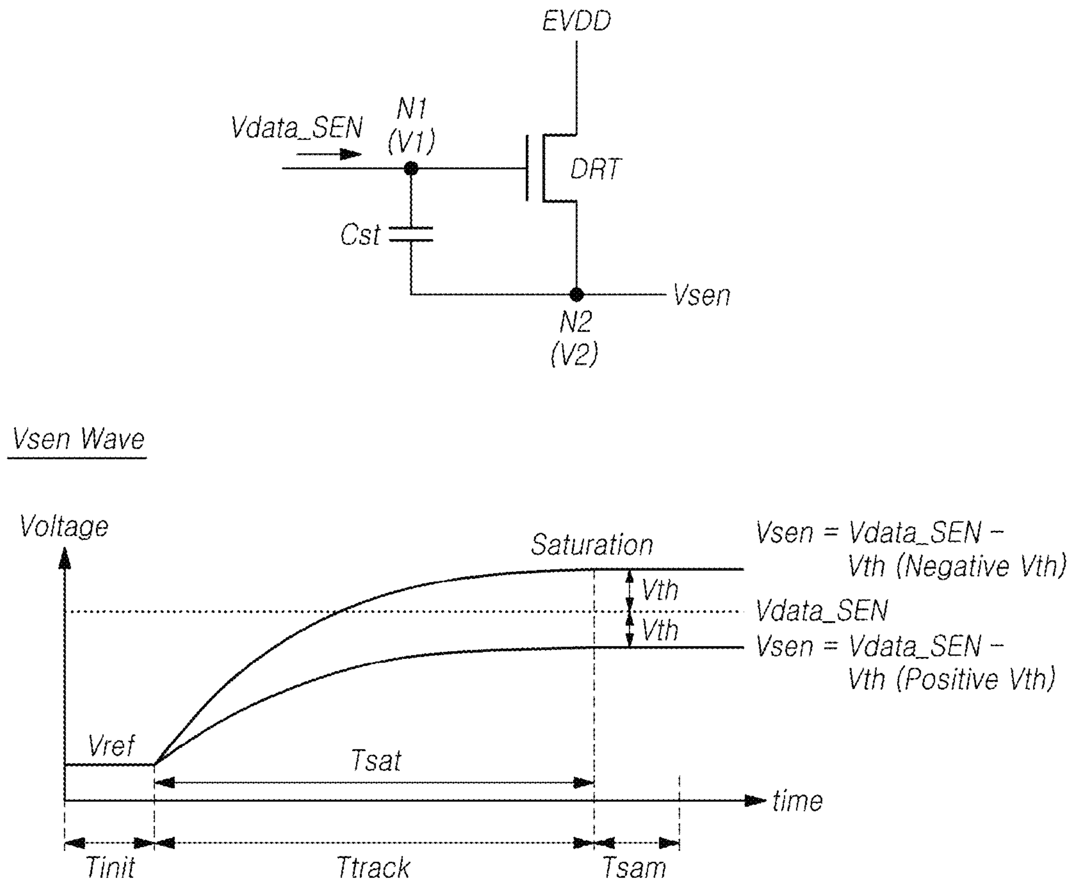
FIGS. 5A and 5B are diagrams illustrating sensing driving of a display device according to embodiments of the disclosure.
Figure 5B:
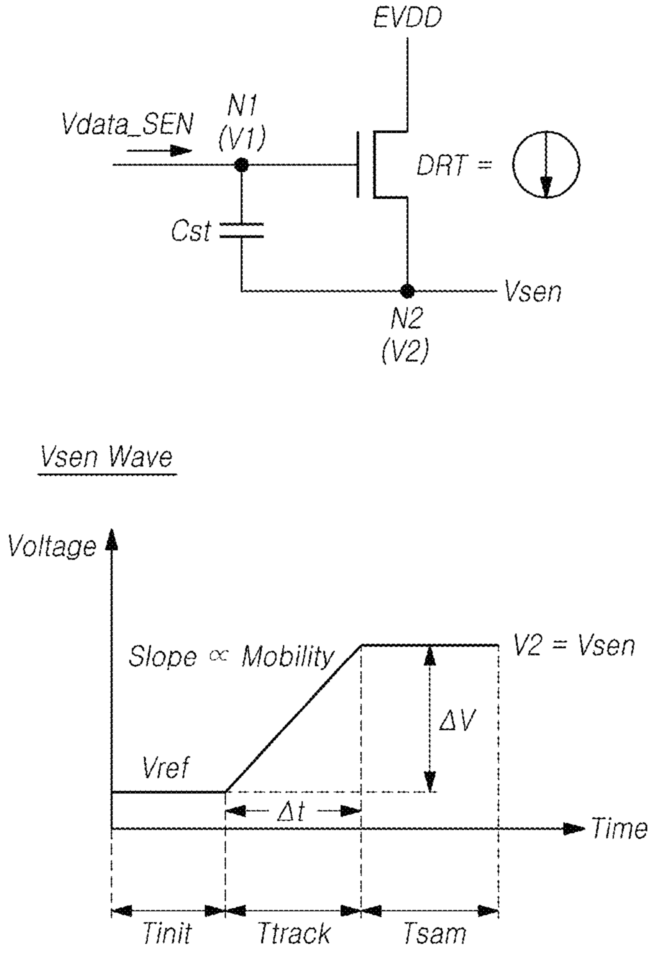

The display device 100 according to embodiments of the disclosure may perform sensing driving in two modes (fast mode and slow mode). Sensing driving in the two modes (fast mode and slow mode) is described below with reference to FIGS. 5A and 5B. FIG. 5A is a diagram for a first sensing mode of the display device 100 according to embodiments of the disclosure. FIG. 5B is a diagram for a second sensing mode of the display device 100 according to embodiments of the disclosure.

Referring to FIG. 5A, the first sensing mode is a sensing driving mode for slowly sensing the characteristic value (e.g., threshold voltage) requiring a relatively long driving time among the characteristic values (e.g., threshold voltage and mobility) of the driving transistor DRT. The first sensing mode may also be referred to as a slow mode or a threshold voltage sensing mode.

Referring to FIG. 5B, the second sensing mode is a sensing driving mode for quickly sensing the characteristic value (e.g., mobility) requiring a relatively short driving time among the characteristic values (e.g., threshold voltage and mobility) of the driving transistor DRT. The second sensing mode may also be referred to as a fast mode or a mobility sensing mode.

Referring to FIGS. 5A and 5B, the sensing driving period of the first sensing mode and the sensing driving period of the second sensing mode, each, may include an initialization period Tinit, a tracking period Ttrack, and a sampling period Tsam. The first sensing mode and the second sensing mode each are described below.

The sensing driving period of the first sensing mode of the display device 100 is described below with reference to FIG. 5A.

Referring to FIG. 5A, the initialization period Tinit of the sensing driving period of the first sensing mode is a period for initializing the first node N1 and the second node N2 of the driving transistor DRT.

During the initialization period Tinit, the voltage V1 of the first node N1 of the driving transistor DRT may be initialized as a sensing driving data voltage Vdata_SEN, and the voltage V2 of the second node N2 of the driving transistor DRT may be initialized as a sensing driving reference voltage Vref.

During the initialization period Tinit, the scan transistor SCT and the sensing transistor SENT may be turned on, and the power switch SPRE may be turned on.

Referring to FIG. 5A, the tracking period Ttrack of the sensing driving period of the first sensing mode is a period for tracking the voltage V2 of the second node N2 of the driving transistor DRT reflecting the threshold voltage Vth of the driving transistor DRT or a change therein.

During the tracking period Ttrack, the power switch SPRE may be turned off, or the sensing transistor SENT may be turned off.

Accordingly, during the tracking period Ttrack, the first node N1 of the driving transistor DRT is in a constant voltage state of having the sensing driving data voltage Vdata_SEN, but the second node N2 of the driving transistor DRT may be in an electrically floating state. Accordingly, during the tracking period Ttrack, the voltage V2 of the second node N2 of the driving transistor DRT may be varied.

During the tracking period Ttrack, the voltage V2 of the second node N2 of the driving transistor DRT may increase until the voltage V2 of the second node N2 of the driving transistor DRT reflects the threshold voltage Vth of the driving transistor DRT.

During the initialization period Tinit, the voltage difference between the first node N1 and second node N2 of the initialized driving transistor DRT may be the threshold voltage Vth of the driving transistor DRT or more. Accordingly, when the tracking period Ttrack starts, the driving transistor DRT is in a turn-on state and conducts current. Accordingly, if the tracking period Ttrack starts, the voltage V2 of the second node N2 of the driving transistor DRT may increase.

During the tracking period Ttrack, the voltage V2 of the second node N2 of the driving transistor DRT does not steadily increase.

To the end of the tracking period Ttrack, the width at which the voltage of the second node N2 of the driving transistor DRT increase may be reduced and, resultantly, the voltage V2 of the second node N2 of the driving transistor DRT may be saturated.

The saturated voltage V2 of the second node N2 of the driving transistor DRT may correspond to the difference Vdata_SEN−Vth between the data voltage Vdata_SEN and the threshold voltage Vth or the difference Vdata_SEN−ΔVth between the data voltage Vdata_SEN and the threshold voltage deviation ΔVth. Here, the threshold voltage Vth may be a negative threshold voltage (Negative Vth) or a positive threshold voltage (Positive Vth).

If the voltage V2 of the second node N2 of the driving transistor DRT is saturated, the sampling period Tsam may be started.

Referring to FIG. 5A, the sampling period Tsam of the sensing driving period of the first sensing mode is a period for measuring the voltage (Vdata_SEN−Vth, Vdata_SEN−ΔVth) reflecting the threshold voltage Vth of the driving transistor DRT or a change therein.

The sampling period Tsam of the sensing driving period of the first sensing mode is a step in which the analog-to-digital converter ADC senses the voltage of the reference voltage line RVL. The voltage of the reference voltage line RVL may correspond to the voltage V2 of the second node N2 of the driving transistor DRT and correspond to the charged voltage of the line capacitor Crvl formed in the reference voltage line RVL.

During the sampling period Tsam, the voltage Vsen sensed by the analog-to-digital converter ADC is the voltage Vdata_SEN−Vth which is the data voltage Vdata_SEN minus the threshold voltage Vth or the voltage Vdata_SEN−ΔVth which is the data voltage Vdata_SEN minus the threshold voltage deviation ΔVth. Here, Vth may be a positive threshold voltage or a negative threshold voltage.

Referring to FIG. 5A, during the tracking period Ttrack of the sensing driving period of the first sensing mode, the saturation time Tsat taken for the voltage V2 of the second node N2 of the driving transistor DRT to be increased and saturated may be a temporal length of the tracking period Ttrack of the sensing driving period of the first sensing mode and may be a time taken for the threshold voltage Vth of the driving transistor DRT or a therein to be reflected to the voltage V2 (V2=Vdata_SEN−Vth) of the second node N2 of the driving transistor DRT.

The saturation time Tsat may occupy most of the overall temporal length of the sensing driving period of the first sensing mode. In the first sensing mode, it may take a quite long time (saturation time: Tsat) for the voltage V2 of the second node N2 of the driving transistor DRT to be increased and saturated.

As described above, the sensing driving scheme for sensing the threshold voltage of the driving transistor DRT requires a long saturation time Tsat until the voltage state of the second node N2 of the driving transistor DRT indicates the threshold voltage of the driving transistor DRT and is thus referred to as a slow mode (first sensing mode).

The sensing driving period of the second sensing mode of the display device 100 is described with reference to FIG. 5B.

Referring to FIG. 5B, the initialization period Tinit of the sensing driving period of the second sensing mode is a period for initializing the first node N1 and the second node N2 of the driving transistor DRT.

During the initialization period Tinit, the scan transistor SCT and the sensing transistor SENT may be turned on, and the power switch SPRE may be turned on.

During the initialization period Tinit, the voltage V1 of the first node N1 of the driving transistor DRT may be initialized as a sensing driving data voltage Vdata_SEN, and the voltage V2 of the second node N2 of the driving transistor DRT may be initialized as a sensing driving reference voltage Vref.

Referring to FIG. 5B, the tracking period Ttrack of the sensing driving period of the second sensing mode is a period during which the voltage V2 of the second node N2 of the driving transistor DRT is changed during a preset tracking time Δt until the voltage V2 of the second node N2 of the driving transistor DRT becomes a voltage state of reflecting the mobility of the driving transistor DRT or a change in mobility.

During the tracking period Ttrack, the preset tracking time Δt may be set to be short. Accordingly, during the short tracking time Δt, it is hard for the voltage V2 of the second node N2 of the driving transistor DRT to reflect the threshold voltage Vth. However, during the short tracking time Δt, the voltage V2 of the second node N2 of the driving transistor DRT may be changed in such an extent as to be able to figure out the mobility of the driving transistor DRT.

Accordingly, the second sensing mode is a sensing driving scheme for sensing the mobility of the driving transistor DRT.

In the tracking period Ttrack, as the power switch SPRE is turned off or the sensing transistor SENT is turned off, the second node N2 of the driving transistor DRT may become an electrically floating state.

During the tracking period Ttrack, by the scan signal SC of the turn-off level voltage, the scan transistor SCT may be in a turned-off state, and the first node N1 of the driving transistor DRT may be in a floating state.

During the initialization period Tinit, the voltage difference between the first node N1 and second node N2 of the initialized driving transistor DRT may be the threshold voltage Vth of the driving transistor DRT or more. Accordingly, when the tracking period Ttrack starts, the driving transistor DRT is in a turn-on state and conducts current.

If the first node N1 and second node N2 of the driving transistor DRT are the gate node and source node, respectively, the voltage difference between the first node N1 and second node N2 of the driving transistor DRT becomes Vgs.

Accordingly, during the tracking period Ttrack, the voltage V2 of the second node N2 of the driving transistor DRT may be increased. In this case, the voltage V1 of the first node N1 of the driving transistor DRT may also be increased.

During the tracking period Ttrack, the increasing rate of the voltage V2 of the second node N2 of the driving transistor DRT is varied depending on the current capability (i.e., mobility) of the driving transistor DRT. As the current capability (mobility) of the driving transistor DRT increases, the voltage V2 of the second node N2 of the driving transistor DRT may be further sharply increased.

After the tracking period Ttrack proceeds the preset tracking time Δt, i.e., after the voltage V2 of the second node N2 of the driving transistor DRT rises during the preset tracking time Δt, the sampling period Tsam may proceed.

During the tracking period Ttrack, the increasing rate of the voltage V2 of the second node N2 of the driving transistor DRT corresponds to the voltage variation ΔV of the second node N2 of the driving transistor DRT during the preset tracking time Δt. The voltage variation Δt of the second node N2 of the driving transistor DRT may correspond to the voltage variation of the reference voltage line RVL.

Referring to FIG. 5B, after the tracking period Ttrack proceeds the preset tracking time Δt, the sampling period Tsam may begin. During the sampling period Tsam, the sampling switch SAM may be turned on, so that the reference voltage line RVL and the analog-to-digital converter ADC may be electrically connected with each other.

The analog-to-digital converter ADC may sense the voltage of the reference voltage line RVL. The voltage Vsen sensed by the analog-to-digital converter ADC may be the voltage Vref+ΔV which is the reference voltage Vref plus an increment during the preset tracking time Δt, i.e., the voltage variation Δt.

The voltage Vsen sensed by the analog-to-digital converter ADC may be the voltage of the reference voltage line RVL and may be the voltage of the second node N2 electrically connected with the reference voltage line RVL through the sensing transistor SENT.

Referring to FIG. 5B, in the sampling period Tsam of the sensing driving period of the second sensing mode, the voltage Vsen sensed by the analog-to-digital converter ADC may be varied depending on the mobility of the driving transistor DRT. As the mobility of the driving transistor DRT increases, the sensing voltage Vsen increases. As the mobility of the driving transistor DRT decreases, the sensing voltage Vsen decreases.

As described above, the sensing driving scheme for sensing the mobility of the driving transistor DRT may change the voltage of the second node N2 of the driving transistor DRT only for a short time Δt and is thus called a fast mode (second sensing mode).

Referring to FIG. 5A, the display device 100 according to embodiments of the disclosure may figure out the threshold voltage Vth of the driving transistor DRT, or a change therein, in the corresponding subpixel SP based on the voltage Vsen sensed through the first sensing mode, calculate the threshold voltage compensation value of reducing or removing the threshold voltage deviation between the driving transistors DRT, and store the calculated threshold voltage compensation value in the memory 410.

Referring to FIG. 5B, the display device 100 according to embodiments of the disclosure may figure out the mobility of the driving transistor DRT, or a change therein, in the corresponding subpixel SP based on the voltage Vsen sensed through the second sensing mode, calculate the mobility compensation value of reducing or removing the mobility deviation between the driving transistors DRT, and store the calculated mobility compensation value in the memory 410.

When supplying the data voltage Vdata for display driving to the corresponding subpixel SP, the display device 100 may supply the data voltage Vdata changed based on the threshold voltage compensation value and the mobility compensation value.

According to the foregoing description, the threshold voltage sensing, by the nature of requiring a long sensing time, may proceed in the first sensing mode, and the mobility sensing, by the nature that a short sensing time suffices, may proceed in the second sensing mode.

Figure 6:
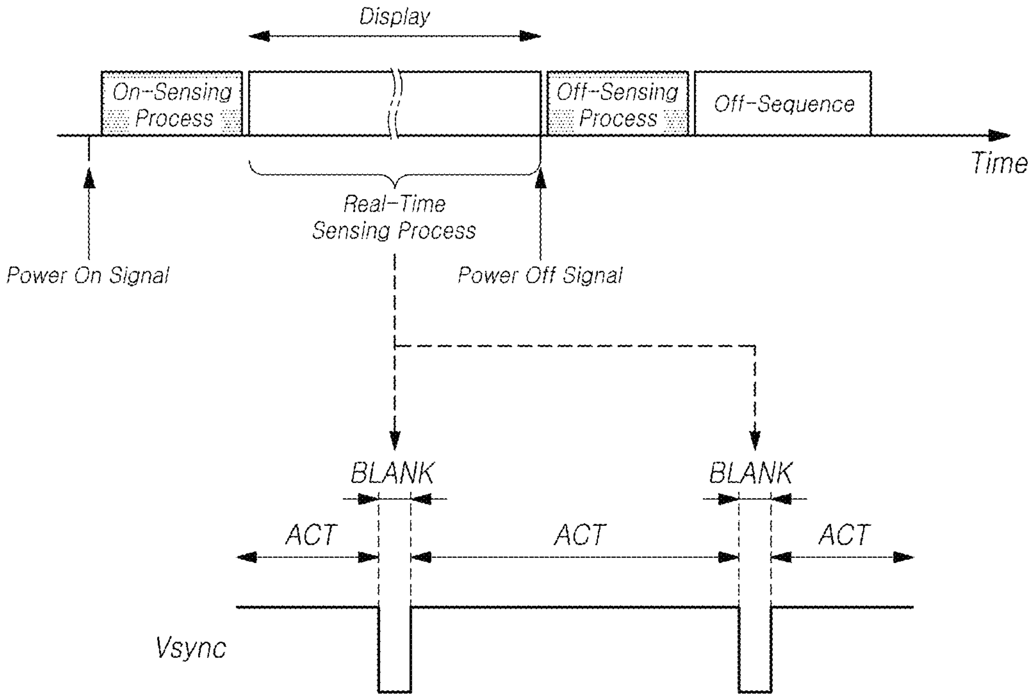
FIG. 6 is a diagram illustrating various sensing driving timings of a display device according to embodiments of the disclosure.

FIG. 6 is a diagram illustrating various sensing driving timings (various sensing periods) of a display device 100 according to embodiments of the disclosure.

Referring to FIG. 6, the display device 100 according to embodiments of the disclosure may sense the characteristic value of the driving transistor DRT in each subpixel SP disposed in the display panel 110 if a power on signal is generated. Such sensing process is referred to as an "on-sensing process."

Referring to FIG. 6, the display device 100 according to embodiments of the disclosure may sense the characteristic value of the driving transistor DRT in each subpixel SP disposed in the display panel 110 before an off sequence, such as power off, proceeds if a power off signal is generated. Such sensing process is referred to as an "off-sensing process."

Referring to FIG. 6, the display device 100 according to embodiments of the disclosure may sense the characteristic value of the driving transistor DRT in each subpixel SP during display driving until before a power off signal is generated after a power on signal is generated. Such sensing process is referred to as a "real-time sensing process."

Such real-time sensing process may be performed every blank time BLANK between the active times ACT with respect to the vertical sync signal Vsync.

Since the mobility sensing of the driving transistor DRT requires only a short time, the mobility sensing may proceed in the second sensing mode among sensing driving schemes.

The mobility sensing that may proceed in the second sensing mode which is the fast mode requires only a short time, so that mobility sensing may proceed in any one of the on-sensing process, off-sensing process, and real-time sensing process.

For example, the mobility sensing which may proceed in the second sensing mode which is the fast mode may proceed in the real-time sensing process that may reflect changes in mobility in real-time during display driving. In other words, the mobility sensing may proceed every blank period during display driving.

In contrast, the threshold voltage sensing of the driving transistor DRT requires a long saturation time Tsat. Accordingly, the threshold voltage sensing may proceed in the first sensing mode among the sensing driving schemes.

The threshold voltage sensing should be performed using a timing when the user's viewing is not disturbed. Accordingly, the threshold voltage sensing of the driving transistor DRT may proceed while display driving is not done (i.e., the circumstance where the user does not intend to view) after a power off signal is generated according to, e.g., a user input. In other words, the threshold voltage sensing may proceed in the off-sensing process.

Figure 7:
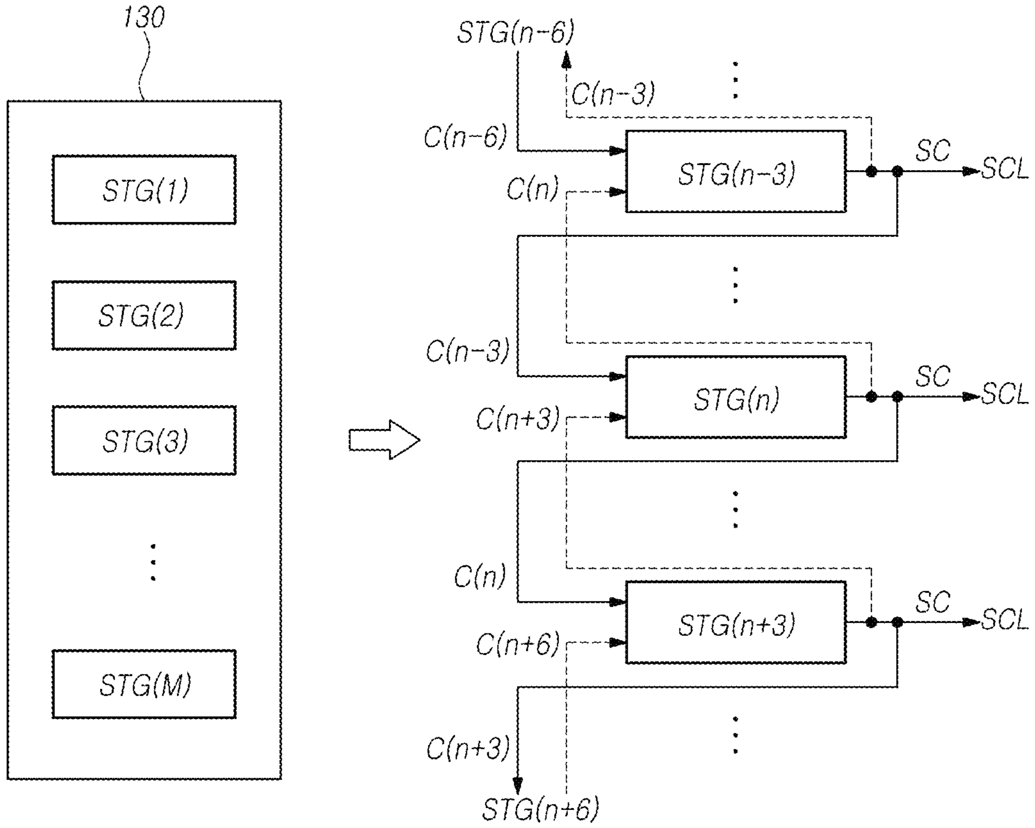
FIG. 7 is a view illustrating example multiple stage circuits of a gate driving circuit according to embodiments of the disclosure.

FIG. 7 is a view illustrating example multiple stage circuits of a gate driving circuit 130 according to embodiments of the disclosure.

Referring to FIG. 7, the gate driving circuit 130 according to embodiments of the disclosure may be connected to a plurality of scan signal lines SCL. Here, the plurality of scan signal lines SCL may be connected to the plurality of subpixels SP disposed on the substrate SUB (see FIGS. 2A and 2B).

Referring to FIG. 7, the gate driving circuit 130 according to embodiments of the disclosure may include a plurality of stage circuits STG(1), STG(2), STG(3), . . . , STG(M) for outputting a plurality of scan signals SC.

Referring to FIG. 7, each of the plurality of stage circuits STG 1, STG 2, STG 3, . . . , STG M may be connected to at least one scan signal line SCL. Each of the plurality of stage circuits STG 1, STG 2, STG 3, . . . , STG M may output at least one scan signal SC.

Referring to FIG. 7, to exemplarily describe the signal connection relationship between the plurality of stage circuits STG(1), STG(2), STG(3), . . . , STG(M), the (n−3)th stage circuit STG (n−3), the nth stage circuit STG(n), and the (n+3)th stage circuit STG (n+3) included in the plurality of stage circuits STG(1), STG(2), STG(3), . . . , STG(M) are exemplified.

Referring to FIG. 7, the scan signal SC output from each of the plurality of stage circuits STG(1), STG(2), STG(3), . . . , STG(M) may serve as a carry signal transmitted to another stage circuit.

The scan signal SC output from the (n−3)th stage circuit STG (n−3) may be supplied to the corresponding scan signal line SCL.

Further, the scan signal SC output from the (n−3)th stage circuit STG(n−3) may be input to the (n−6)th stage circuit STG (n−6) and the nth stage circuit STG(n) as the (n−3)th carry signal C(n−3).

The scan signal SC output from the nth stage circuit STG(n) may be supplied to the corresponding scan signal line SCL.

Further, the scan signal SC output from the nth stage circuit STG(n) may be input to the (n−3)th stage circuit STG (n−3) and the (n+3)th stage circuit STG(n+3), as the nth carry signal C(n).

The scan signal SC output from the (n+3)th stage circuit STG (n+3) may be supplied to the corresponding scan signal line SCL.

Also, the scan signal SC output from the (n+3)th stage circuit STG(n+3) may be input to the nth stage circuit STG(n)) and the (n+6)th stage circuit STG (n+6), as the (n+3)th carry signal C(n+3).

Hereinafter, any nth stage circuit STG(n) among the plurality of stage circuits STG(1), STG(2), STG(3), . . . , STG(M) will be described in more detail.

Figure 8:
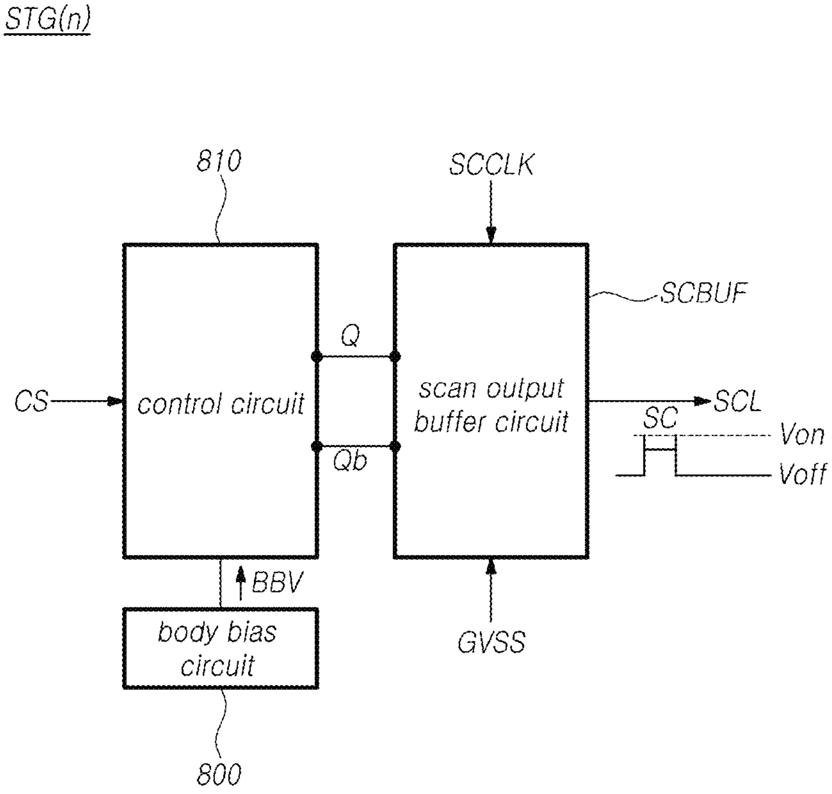
FIG. 8 is a block diagram illustrating an nth stage circuit in a gate driving circuit according to embodiments of the disclosure.

FIG. 8 is a block diagram of an nth stage circuit STG(n) in the gate driving circuit 130 according to embodiments of the disclosure.

Referring to FIG. 8, the nth stage circuit STG(n) in the gate driving circuit 130 according to embodiments of the disclosure may include a scan output buffer circuit SCBUF configured to output the scan signal SC to the scan signal line SCL and a control circuit 810 configured to control the scan output buffer circuit SCBUF.

Referring to FIG. 8, the scan output buffer circuit SCBUF may receive a scan clock signal SCCLK and a low-potential voltage GVSS, generate a scan signal SC according to the voltages of the Q node and the Qb node, and output the generated scan signal SC to the corresponding scan signal line SCL.

The generated scan signal SC may include a first signal section having a turn-off level voltage Voff and a second signal section having a turn-on level voltage Von.

The turn-on level voltage Von may be a voltage of the scan signal SC capable of turning on the scan transistor SCT having the gate node to which the scan signal SC is applied. The turn-off level voltage Voff may be a voltage of the scan signal SC capable of turning off the scan transistor SCT having the gate node to which the scan signal SC is applied.

For example, when the scan transistor SCT is an n-type transistor, the turn-on level voltage Von may be a high level voltage, and the turn-off level voltage Voff may be a low level voltage. When the scan transistor SCT is a p-type transistor, the turn-on level voltage Von may be a low level voltage, and the turn-off level voltage Voff may be a high level voltage. Hereinafter, for convenience of description, it is assumed that the turn-on level voltage Von is a high level voltage and the turn-off level voltage Voff is a low level voltage.

The scan signal SC output from the scan output buffer circuit SCBUF may have different voltage levels depending on the voltages of the Q node and the Ob node. For example, when the voltage of the Q node is a high level voltage and the voltage of the Qb node is a low level voltage, the scan signal SC may be a turn-on level voltage. When the voltage of the Q node is a low level voltage and the voltage of the Qb node is a high level voltage, the scan signal SC may be a turn-off level voltage.

Referring to FIG. 8, the control circuit 810 may control the voltage of the Q node and the voltage of the Qb node to control the operation of the scan output buffer circuit SCBUF.

To this end, the control circuit 810 may receive at least one control signal CS and control the voltage of the Q node and the voltage of the Qb node using the input at least one control signal CS.

The voltage level of the Q node and the voltage level of the Qb node may be opposite to each other. When the voltage level of the Q node is a high level, the voltage level of the Qb node may be a low level. When the voltage level of the Q node is a low level, the voltage level of the Qb node may be a high level.

Referring to FIG. 8, in the gate driving circuit 130 according to embodiments of the disclosure, the nth stage circuit STG(n) may further include a body bias circuit 800 configured to supply the body bias voltage BBV to the control circuit 810.

In the gate driving circuit 130 according to embodiments of the disclosure, the body bias circuit 800 may supply the body bias voltage BBV to the control circuit 810, thereby helping to stabilize the operation of the control circuit 810. Accordingly, accurate and normal gate driving is possible, and image quality may be enhanced.

When the driving time of the first Q node discharge transistor T3 increases, the threshold voltage of the first Q node discharge transistor T3 may be shifted, and thus the first Q node discharge transistor T3 may have a low positive threshold voltage or a negative threshold voltage.

If the gate driving circuit 130 according to the embodiments of the disclosure does not include the body bias circuit 800, the first Q node discharge transistor T3 having a lowered positive threshold voltage or a negative threshold voltage may not be completely turned off and may generate a leakage current during a period when the first Q node discharge transistor T3 should be turned off. Here, the period during which the first Q node discharge transistor T3 should be turned off may correspond to a period (e.g., S10 of FIG. 10) during which the Q node has a high-level voltage and the Qb node has a low-level voltage.

If the gate driving circuit 130 according to embodiments of the disclosure does not include the body bias circuit 800, during a period (e.g., S10 of FIG. 10) in which the Q node has a high-level voltage and the Qb node has a low-level voltage, the first Q node discharge transistor T3 having a lowered positive threshold voltage or a negative threshold voltage may not be completely turned off and may cause a leakage current, and the voltage of the low-potential voltage node LV may rise. Here, the path of the leakage current may include a Q node, a first Q node discharge transistor T3, and a low-potential voltage node LV.

However, even if the first Q node discharge transistor T3 has a lowered positive threshold voltage or a negative threshold voltage, when the gate driving circuit 130 according to embodiments of the disclosure includes the body bias circuit 800, the body bias voltage BBV of the first voltage level LV1 may be applied to the body B of the first Q node discharge transistor T3 during a period (e.g., S10 of FIG. 10) in which the Q node has a high-level voltage and the Qb node has a low-level voltage, so that the first Q node discharge transistor T3 may be completely turned off.

Accordingly, during the period (e.g., S10 of FIG. 10) in which the Q node has a high-level voltage and the Qb node has a low-level voltage, a leakage current may be prevented in the gate driving circuit 130, and thus the gate driving circuit 130 may perform a stable operation. Thus, it is possible to help enhance image quality.

Hereinafter, in the gate driving circuit 130 according to embodiments of the disclosure, the nth stage circuit STG(n) including the body bias circuit 800 will be described in more detail.

Figure 9:
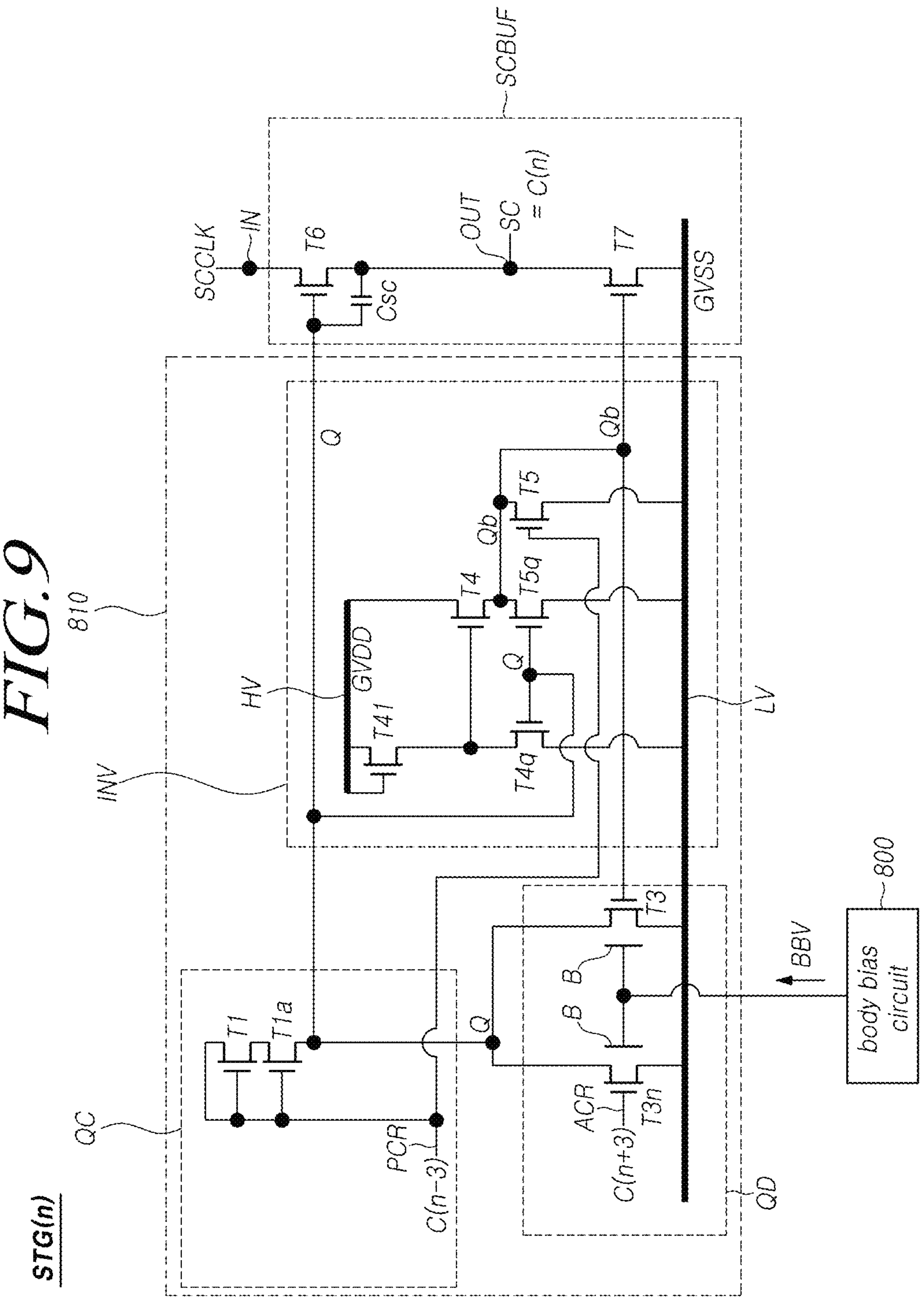
FIG. 9 is a detailed circuit diagram illustrating an nth stage circuit in a gate driving circuit according to embodiments of the disclosure.

FIG. 9 is a detailed circuit diagram of an nth stage circuit STG(n) in the gate driving circuit 130 according to embodiments of the disclosure.

Referring to FIG. 9, an nth stage circuit STG(n) included in a gate driving circuit 130 according to embodiments of the disclosure may include a scan output buffer circuit SCBUF, a control circuit 810, and a body bias circuit 800.

Referring to FIG. 9, the scan output buffer circuit SCBUF may receive the scan clock signal SCCLK from the scan clock node IN and may receive the low-potential voltage GVSS from the low-potential voltage node LV.

The scan output buffer circuit SCBUF may be configured to output the scan signal SC including the first signal section having the turn-off level voltage Voff and the second signal section having the turn-on level voltage Von according to the voltages of the Q node and the Qb node.

Referring to FIG. 9, the control circuit 810 may be configured to control voltages of the Q node and the Qb node to control the operation of the scan output buffer circuit SCBUF.

The control circuit 810 may include a plurality of transistors to control the voltage of the Q node and the voltage of the Qb node.

The plurality of transistors included in the control circuit 810 may include a first Q node discharge transistor T3.

Referring to FIG. 9, the first Q node discharge transistor T3 may be turned on or off by the voltage of the Qb node to control the connection between the Q node and the low-potential voltage node LV to which the low-potential voltage GVSS is applied.

Referring to FIG. 9, the first Q node discharge transistor T3 may be turned on or off by the voltage of the Qb node to control the connection between the low-potential voltage node LV and the Q node. The voltage level of the body bias voltage BBV may change according to the state of the first Q node discharge transistor T3.

The scan output buffer circuit SCBUF may include a scan pull-up transistor T6 and a scan pull-down transistor T7.

The scan pull-up transistor T6 may be turned on or off according to the voltage of the Q node to control the connection between the scan clock node IN to which the scan clock signal SCCLK is input and the scan output node OUT to which the scan signal SC is output.

A scan capacitor Csc may be connected between the gate node and the source node (or drain node) of the scan pull-up transistor T6. The gate node of the scan pull-up transistor T6 may correspond to the Q node, and the source node (or drain node) of the scan pull-up transistor T6 may correspond to the scan output node OUT.

The scan pull-down transistor T7 may be turned on or off according to the voltage of the Qb node to control the connection between the scan output node OUT and the low-potential voltage node LV.

The scan pull-up transistor T6 may output the scan signal SC of the signal section having the turn-on level voltage Von at the first timing. The scan pull-down transistor T7 may output the scan signal SC of the signal section having the turn-off level voltage Voff at a second timing different from the first timing.

The first timing and the second timing may be periods included within one frame time. The first timing may be before or after the second timing, or may be both before and after the second timing.

Referring to FIG. 9, the control circuit 810 may include a Q node charging circuit QC configured to charge the Q node, a Q node discharging circuit QD configured to discharge the Q node, and an inverter circuit INV configured to charge and discharge the Qb node. The above-mentioned first Q node discharge transistor T3 may be included in the Q node discharging circuit QD.

Referring to FIG. 9, the Q node charging circuit QC may include at least one Q node charge transistor T1 and T1*a* that is turned on or off by a previous carry signal C(n−3) output from the previous stage circuit STG(n−3) to control the connection between the previous carry node PCR to which the previous carry signal C(n−3) is input and the Q node.

The first Q node charge transistor T1 and the second Q node charge transistor T1*a* may be connected in series between the previous carry node PCR and the Q node. The gate node of the first Q node charge transistor T1 and the gate node of the second Q node charge transistor T1*a* may be commonly connected to the previous carry node PCR. The first Q node charge transistor T1 may be in a diode connection state in which the source node (or drain node) and the gate node are connected.

The previous stage circuit STG(n−3) described above may output a scan signal SC having a turn-on level voltage ahead of the nth stage circuit STG(n) of FIG. 9.

The previous stage circuit STG(n−3) may be determined according to the gate driving method or the number of phases of the scan clock signal SCCLK. For example, the previous stage circuit STG (n−3) may be the (n−1)th stage circuit STG (n−1), the (n−2)th stage circuit STG (n−2), the (n−3)th stage circuit STG (n−3), or the (n−4)th stage circuit STG (n−4).

In embodiments of the disclosure, the previous stage circuit STG(n−3) is exemplified as the (n−3)th stage circuit STG (n−3). Accordingly, the previous carry signal C(n−3) is exemplified as the carry signal C(n−3) output from the (n−3)th stage circuit STG(n−3). Here, the carry signal C(n−3) output from the (n−3)th stage circuit STG (n−3) may be a scan signal SC output from the (n−3)th stage circuit STG (n−3).

Referring to FIG. 9, the Q node discharging circuit QD may further include a second Q node discharge transistor T3*n* as well as the first Q node discharge transistor T3 described above.

Each of the first Q node discharge transistor T3 and the second Q node discharge transistor T3*n* may control the connection between the Q node and the low-potential voltage node LV.

Each of the first Q node discharge transistor T3 and the second Q node discharge transistor T3*n* may be connected between the Q node and the low-potential voltage node LV. However, the first Q node discharge transistor T3 and the second Q node discharge transistor T3*n* may have different gate node connection structures.

The gate node of the first Q node discharge transistor T3 may be electrically connected to the Qb node. The gate node of the second Q node discharge transistor T3*n* may be electrically connected to the next carry node ACR.

The first Q node discharge transistor T3 may be turned on or off according to the voltage of the Q node to control the connection between the Q node and the low-potential voltage node LV.

The second Q node discharge transistor T3*n* may be turned on or off by the next carry signal C(n+3) output from the next stage circuit STG(n+3) to control the connection between the Q node and the low-potential voltage node LV.

The body B of the first Q node discharge transistor T3 and the body B of the second Q node discharge transistor T3*n* may be electrically connected to each other.

The next stage circuit STG (n+3) described above may output the scan signal SC having the turn-on level voltage later than the nth stage circuit STG(n) of FIG. 9.

The next stage circuit STG (n+3) may be determined according to the gate driving method or the number of phases of the scan clock signal SCCLK. For example, the next stage circuit STG (n+3) may be the (n+1)th stage circuit STG (n+1), the (n+2)th stage circuit STG (n+2), the (n+3)th stage circuit STG(n+3), or the (n+4)th stage circuit STG (n+4).

In embodiments of the disclosure, the next stage circuit STG(n+3) is exemplified as the (n+3)th stage circuit STG (n+3). Accordingly, the next stage circuit STG (n+3) is exemplified as the carry signal C(n+3) output from the (n+3)th stage circuit STG (n+3). Here, the carry signal C(n+3) output from the (n+3)th stage circuit STG (n+3) may be a scan signal SC output from the (n+3)th stage circuit STG (n+3).

Referring to FIG. 9, the inverter circuit INV may include a first Qb node charge transistor T4 and a first Qb node discharge transistor T5.

The first Qb node charge transistor T4 may control the connection between the high-potential voltage node HV to which the high-potential voltage GVDD is applied and the Qb node.

The first Qb node discharge transistor T5 may control connection between the Qb node and the low-potential voltage node LV. The gate node of the first Qb node discharge transistor T5 may be electrically connected to the previous carry node PCR to which the previous carry signal C(n−3) is applied.

Referring to FIG. 9, the inverter circuit INV may further include a second Qb node discharge transistor T5*q* for controlling the connection between the Qb node and the low-potential voltage node LV.

The first Qb node discharge transistor T5 and the second Qb node discharge transistor T5*q* are transistors for controlling the connection between the Qb node and the low-potential voltage node LV, but the connection positions of the gate nodes may be different.

As the gate node of the first Qb node discharge transistor T5 and the gate node of the second Qb node discharge transistor T5*q* are connected to different positions, the first Qb node discharge transistor T5 and the second Qb node discharge transistor T5*q* may be turned on or off by different signals or different voltages.

The gate node of the first Qb node discharge transistor T5 may be electrically connected to the previous carry node PCR. Accordingly, the first Qb node discharge transistor T5 may be turned on or off by the previous carry signal C(n−3).

The gate node of the second Qb node discharge transistor T5*q* may be electrically connected to the Q node. Accordingly, the second Qb node discharge transistor T5*q* may be turned on or off according to the voltage of the Q node.

Referring to FIG. 9, the inverter circuit INV may further include a first control transistor T41 and a second control transistor T4*q*.

The first control transistor T41 may be controlled according to the high-potential voltage GVDD to control connection between the gate node of the first Qb node charge transistor T4 and the high-potential voltage node HV.

The gate node of the first control transistor T41 and the drain node (or source node) of the first control transistor T41 may be connected to the high-potential voltage node HV. In other words, the first control transistor T41 may be in a diode connection state.

The first control transistor T41 may be turned on to apply the high-potential voltage GVDD to the gate node of the first Qb node charge transistor T4. Accordingly, the first Qb node charge transistor T4 may be turned on. In other words, the first control transistor T41 may be a control transistor capable of turning the first Qb node charge transistor T4 on. While the high-potential voltage GVDD is applied to the high-potential voltage node HV, the first control transistor T41 may always be in the turn-on state, and accordingly, the first Qb node charge transistor T4 may always be in the turn-on state.

The second control transistor T4*q* may be turned on or off according to the voltage of the Q node to control the connection between the gate node of the first Qb node charge transistor T4 and the low-potential voltage node LV. The gate node of the second control transistor T4*q* may be electrically connected to the Q node.

When the Q node has a high-level voltage, the second control transistor T4*q* may be turned on to electrically connect the gate node of the first Qb node charge transistor T4 to the low-potential voltage node LV. Accordingly, the first Qb node charge transistor T4 may be turned off.

When the Q node has a low-level voltage, the second control transistor T4*q* may be turned off. Accordingly, the gate node of the first Qb node charge transistor T4 may have the high-potential voltage GVDD supplied through the first control transistor T41. Accordingly, when the first Qb node charge transistor T4 is turned on, the Qb node corresponding to the source node (or drain node) of the first Qb node charge transistor T4 may be electrically connected to the high-potential voltage node HV. Accordingly, the Qb node may be in a charging state having the high-potential voltage GVDD.

As described above, the second control transistor T4*q* may be turned on according to the high level voltage of the Q node to control the first Qb node charge transistor T4 to be turned off. Accordingly, the Qb node may be discharged.

The second control transistor T4*q* may be turned off according to the low-level voltage of the Q node to control the first Qb node charge transistor T4 to be turned on. Accordingly, the Qb node may be charged.

Referring to FIG. 9, the body bias circuit 800 may be configured to supply the body bias voltage BBV to the body B of the first Q node discharge transistor T3.

The body B of the first Q node discharge transistor T3 and the body B of the second Q node discharge transistor T3*n* may be electrically connected to each other. Accordingly, the body bias voltage BBV may be applied to both the body B of the first Q node discharge transistor T3 and the body B of the second Q node discharge transistor T3*n*.

The body bias voltage BBV supplied from the body bias circuit 800 may be a voltage whose voltage level changes rather than a voltage having a constant voltage level.

Referring to FIG. 9, the body bias circuit 800 may be configured as various circuits. For example, the body bias circuit 800 may be implemented as a power supply circuit, a power integrated circuit, or the like. In this case, the body bias circuit 800 may be mounted on the source printed circuit board SPCB or the control printed circuit board CPCB. Alternatively, the body bias circuit 800 may be of a type disposed on the display panel 100.

All or some of the transistors included in the nth stage circuit STG(n) included in the gate driving circuit 130 illustrated in FIG. 9 may be oxide semiconductor transistors. The transistors included in the nth stage circuit STG(n) may have intrinsic characteristic values such as threshold voltage and mobility. The intrinsic characteristic values of the transistors included in the nth stage circuit STG(n) may change over the driving time.

Figure 10:
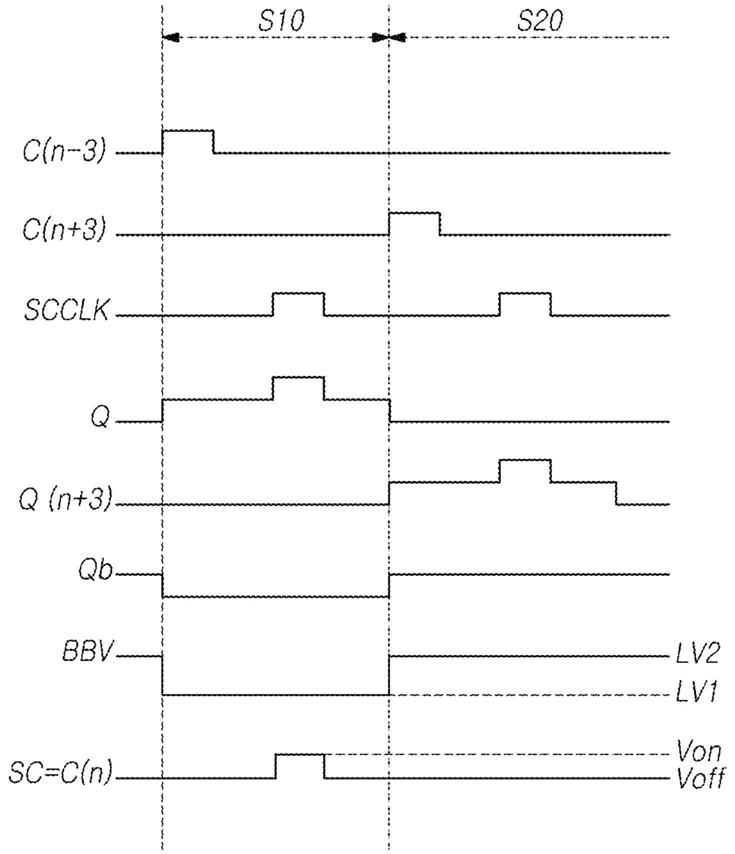
FIG. 10 is a driving timing diagram illustrating an nth stage circuit in a gate driving circuit according to embodiments of the disclosure.

FIG. 10 is a driving timing diagram of an nth stage circuit STG(n) in the gate driving circuit 130 according to embodiments of the disclosure.

Referring to FIG. 10, the operation period of the nth stage circuit STG(n) may include a first period S10 in which the voltage of the Q node is increased to the high-level voltage and a second period S20 in which the Q node becomes the low-level voltage and the Qb node becomes the high-level voltage.

The first period S10 may be referred to as a bootstrapping period, and the second period S20 may also be referred to as an inverting period or a low-level output holding period.

Referring to FIG. 10, a previous carry signal C(n−3) input to an n-th stage circuit STG(n) may have a high-level voltage at a first carry timing within the first period S10, may have a low-level voltage during a period other than the first carry timing within the first period S10, and may have a low-level voltage during the second period S20.

Referring to FIG. 10, the next carry signal C (n+3) having the low-level voltage input to the nth stage circuit STG(n) may have the high-level voltage at the second carry timing within the second period S20, may have the low-level voltage during the first period S10, and may have the low-level voltage during a period other than the second carry timing within the second period S20.

Referring to FIG. 10, the scan clock signal SCCLK may have a high-level voltage at the first clock timing within the first period S10 and the second clock timing within the second period S20, may have a low-level voltage during a period other than the first clock timing within the first period S10, and may have a low-level voltage during a period other than the second clock timing within the second period S20.

Referring to FIG. 10, the Q node in the n-th stage circuit STG(n) may have a high-level voltage during the first period S10 and may have a low-level voltage during the second period S20.

When the first period S10 starts, the voltage of the Q node may rise (primary voltage rise) to have the primary high-level voltage H1.

Within the first period S10, at the rising timing at which the voltage of the scan clock signal SCCLK rises from the low-level voltage to the high-level voltage, the voltage of the Q node may rise (secondary voltage rise) from the primary high-level voltage H1 to have the secondary high-level voltage H2.

Within the first period S10, at the falling timing when the voltage of the scan clock signal SCCLK falls from the high-level voltage to the low-level voltage, the voltage of the Q node may fall from the secondary high-level voltage H2 to the primary high-level voltage H1.

During the second period S20, the voltage of the Q node may have a low-level voltage L.

Referring to FIG. 10, the Q node Q(n+3) in the (n+3)th stage circuit STG (n+3) may have a low-level voltage during the first period S10 and a high-level voltage during the second period S20.

Referring to FIG. 10, the Qb node in the n-th stage circuit STG(n) may have a low-level voltage during the first period S10 and a high-level voltage during the second period S20.

Referring to FIG. 10, during a period when the scan clock signal SCCLK has a high-level voltage within the first period S10, the scan signal SC output from the nth stage circuit STG(n) may have a turn-on-level voltage Von. Here, the period when the scan clock signal SCCLK has the high-level voltage within the first period S10 may be a period when the Q node has the secondary high-level voltage H2 within the first period S10.

Referring to FIG. 10, the body bias voltage BBV may have a first voltage level LV1 during the first period S10 and may have a second voltage level LV2 different from the first voltage level LV1 during the second period S20 after the first period S10.

For example, the first voltage level LV1 may be a voltage level lower than the second voltage level LV2. The first voltage level LV1 may be lower than the low-potential voltage GVSS.

Referring to FIG. 10, the voltage level change pattern of the body bias voltage BBV may correspond to the voltage level change pattern of the Qb node. In other words, the body bias voltage BBV may have a voltage level that changes according to the voltage level of the Qb node.

For example, when the Qb node has a low-level voltage, the body bias voltage BBV may have a first voltage level LV1. When the Qb node has a high-level voltage, the body bias voltage BBV may have a second voltage level LV2 different from the first voltage level LV1. For example, the second voltage level LV2 may be a voltage level higher than the first voltage level LV1.

Referring to FIG. 10, the body bias voltage BBV may have a voltage level that varies according to the voltage level of the Q node.

For example, when the Q node has the high-level voltages H1 and H2, the body bias voltage BBV may have the first voltage level LV1. When the Q node has the low-level voltage L, the body bias voltage BBV may have the second voltage level LV2.

Referring to FIG. 10, the body bias voltage BBV may have a voltage level that varies according to an operating state of the scan output buffer circuit SCBUF.

For example, when the scan signal SC output from the scan output buffer circuit SCBUF is the second signal section having the turn-on level voltage Von, the body bias voltage BBV may have the first voltage level LV1. When the scan signal SC output from the scan output buffer circuit SCBUF is the first signal section having the turn-off level voltage Voff, the body bias voltage BBV may have a second voltage level LV2 different from the first voltage level LV1.

Figure 11:
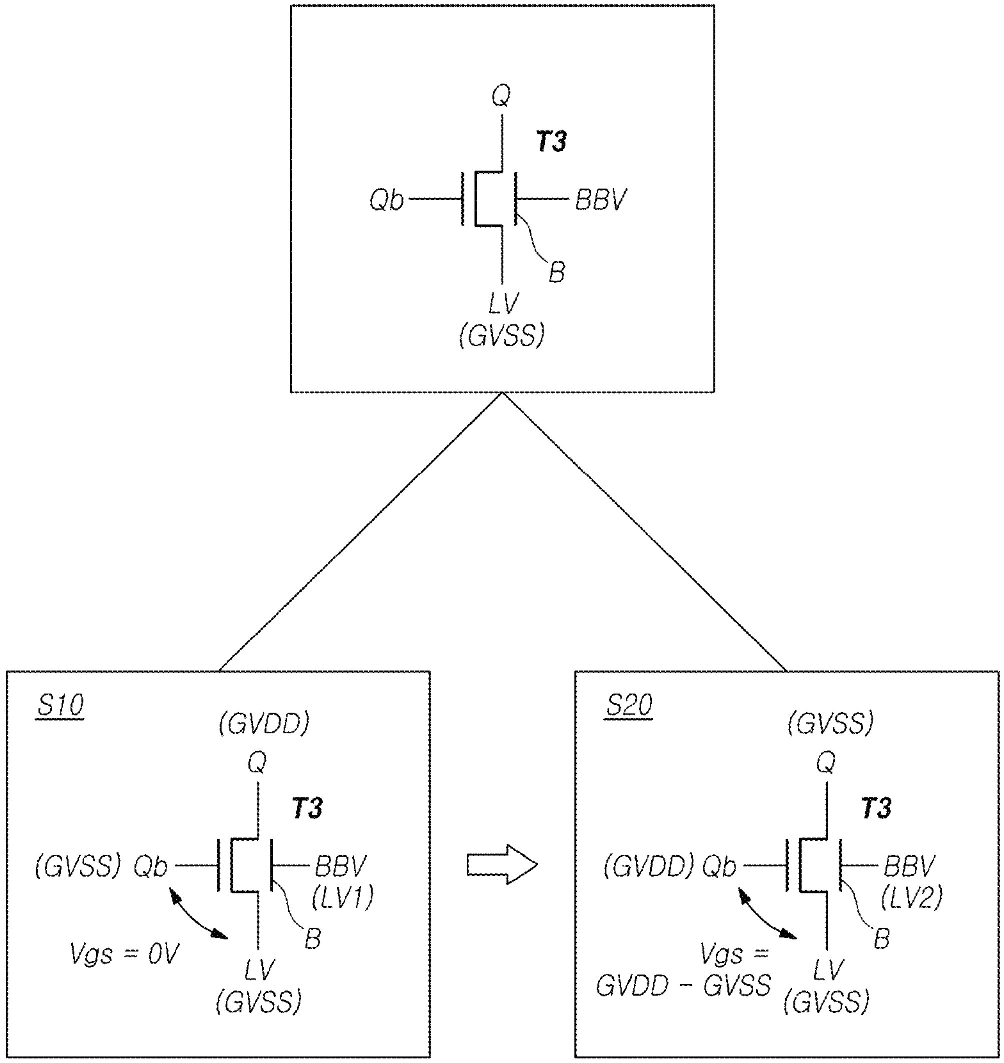
FIG. 11 illustrates a state change of a first Q node discharge transistor according to driving of an nth stage circuit in a gate driving circuit according to embodiments of the disclosure.

FIG. 11 illustrates a state change of a first Q node discharge transistor T3 according to driving of an n-th stage circuit STG(n) in a gate driving circuit 130 according to embodiments of the disclosure.

Referring to FIG. 11, the first Q node discharge transistor T3 includes a source node, a drain node, and a gate node. In the first Q node discharge transistor T3, the gate node may be electrically connected to the Qb node, the drain node (or source node) may be electrically connected to the Q node, and the source node (or drain node) may be electrically connected to the low-potential voltage node LV to which the low-potential voltage GVSS is applied.

Referring to FIG. 11, during the first period S10, the Q node may be in a state in which the high-potential voltage GVDD is applied, and the Qb node may be in a state in which the low-potential voltage GVSS is applied.

Because the Qb node electrically connected to the gate node of the first Q node discharge transistor T3 during the first period S10 has the low-potential voltage GVSS, the first Q node discharge transistor T3 may be turned off during the first period S10.

During the first period S10, the first Q node discharge transistor T3 needs to maintain a normal and complete turn-off state for an accurate charging operation of the Q node. Accordingly, during the first period S10 when the first Q node discharge transistor T3 needs to be turned off, the body bias voltage BBV may have the first voltage level LV1, which is a fairly low voltage level.

For example, the first voltage level LV1 may be a voltage level lower than the low-potential voltage GVSS. Accordingly, the first Q node discharge transistor T3 may be completely turned off by the body bias voltage BBV of the very low first voltage level LV1 applied to the body B. Accordingly, the leakage current through the first Q node discharge transistor T3 may be completely cut off.

The body bias voltage BBV of the very low first voltage level LV1 being applied to the body B of the first Q node discharge transistor T3 may be similar to the threshold voltage of the first Q node discharge transistor T3 changing in the positive direction. Here, changing the threshold voltage in the positive direction may correspond to increasing the threshold voltage.

As described above, during the first period S10, the body bias voltage BBV of the very low first voltage level LV1 is applied to the body B of the first Q node discharge transistor T3, so that the first Q node discharge transistor T3 may maintain a complete turn-off state, and during the first period S10, the scan signal SC having the turn-on level voltage Von may be normally generated.

Referring to FIG. 11, during the second period S20, the Q node may be in a state in which the low-potential voltage GVSS is applied, and the Qb node may be in a state in which the high-potential voltage GVDD is applied.

Because the Qb node electrically connected to the gate node of the first Q node discharge transistor T3 has the high-potential voltage GVDD during the second period S20, the first Q node discharge transistor T3 may be in the turn-on state during the second period S20.

During the second period S20, the first Q node discharge transistor T3 needs to be maintained in the turn-on state for an accurate discharge operation of the Q node. Accordingly, during the second period S20 when the first Q node discharge transistor T3 needs to be turned on, the body bias voltage BBV may have a second voltage level LV2 higher than the first voltage level LV1.

The body bias voltage BBV of the second voltage level LV2 higher than the first voltage level LV1 being applied to the body B of the first Q node discharge transistor T3 may be similar to the threshold voltage of the first Q node discharge transistor T3 changing in the negative direction. Here, changing the threshold voltage in the negative direction may correspond to decreasing the threshold voltage.

As described above, during the second period S20, the body bias voltage BBV of the second voltage level LV2 higher than the first voltage level LV1 is applied to the body B of the first Q node discharge transistor T3, and thus the first Q node discharge transistor T3 may be normally turned on. Accordingly, during the second period S20, the scan signal SC having the turn-off level voltage Voff may be normally generated.

Figure 12:
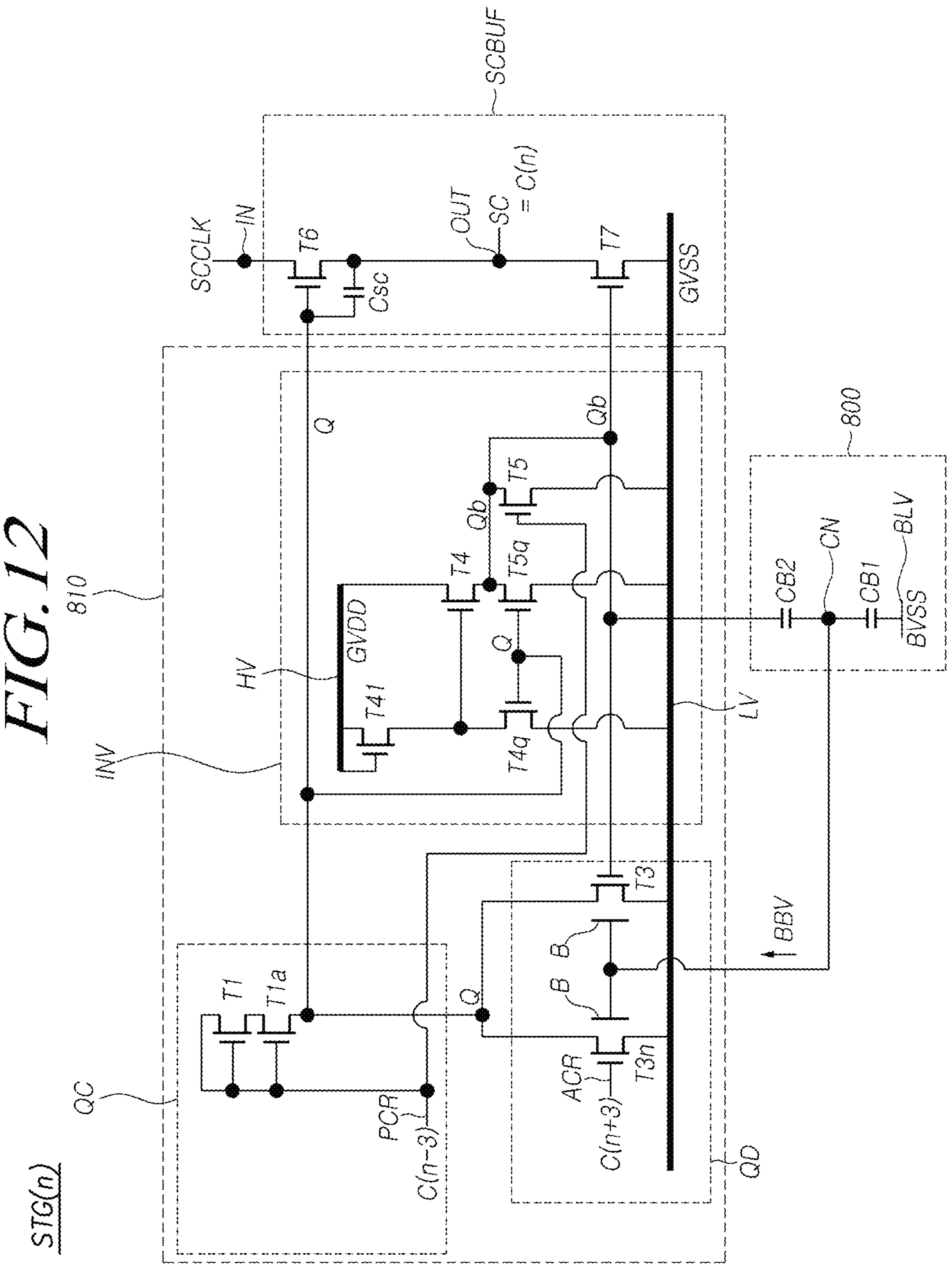
FIG. 12 is another detailed circuit diagram illustrating an nth stage circuit in a gate driving circuit according to embodiments of the disclosure.

FIG. 12 is another detailed circuit diagram of an nth stage circuit STG(n) in the gate driving circuit 130 according to embodiments of the disclosure. The nth stage circuit STG(n) of FIG. 12 has substrate the same configuration as the nth stage circuit StG(n) of FIG. 9 except for the body bias circuit 800.

As described above, the change pattern of the body bias voltage BBV may be similar to the voltage change pattern of the Qb node. Based on this, the Qb node and the body B of the first Q node discharge transistor T3 may be capacitively connected.

Referring to FIG. 12, the body bias circuit 800 may include a first bias capacitor CB1 and a second bias capacitor CB2.

The first bias capacitor CB1 may be connected between the body B of the first Q node discharge transistor T3 and the global low-potential voltage node BLV to which the global low-potential voltage BVSS is applied.

The second bias capacitor CB2 may be connected between the body B of the first Q node discharge transistor T3 and the Qb node. Alternatively, the second bias capacitor CB2 may be connected between the body B of the first Q node discharge transistor T3 and the drain node or source node of the second Qb node discharge transistor T5*q*.

The first bias capacitor CB1 and the second bias capacitor CB2 may be connected in series between the global low-potential voltage node BLV and the Qb node.

The connection point CN of the first bias capacitor CB1 and the second bias capacitor CB2 may be the body B of the first Q node discharge transistor T3 or may be electrically connected to the body B of the first Q node discharge transistor T3.

As described above, the body bias circuit 800 may be simply configured using the first bias capacitor CB1 and the second bias capacitor CB2.

For example, the second bias capacitor CB2 may have a capacitance greater than that of the first bias capacitor CB2.

The body bias circuit 800 including the first bias capacitor CB1 and the second bias capacitor CB2 may be disposed on the display panel 110 or may be disposed on the source printed circuit board SPCB or the control printed circuit board CPCB.

Figure 13:
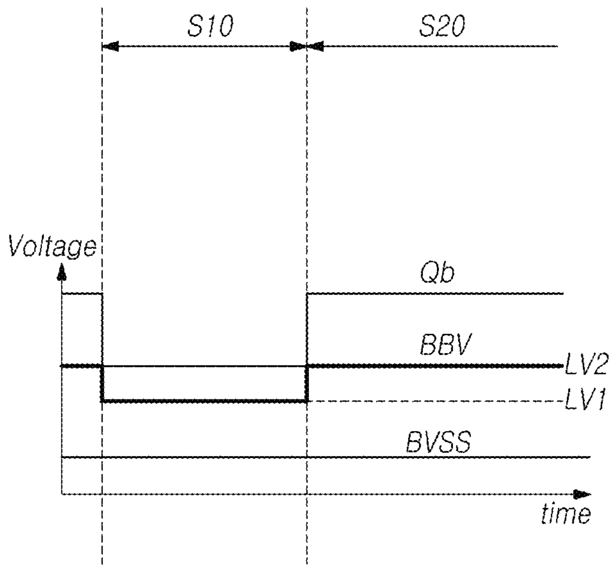
FIG. 13 illustrates changes in Qb node and body bias voltage according to driving of an nth stage circuit in a gate driving circuit according to embodiments of the disclosure.

FIG. 13 illustrates a change in a Qb node and a body bias voltage BBV according to driving of an nth stage circuit (STG(n)) in a gate driving circuit 130 according to embodiments of the disclosure.

Referring to FIG. 13, during the first period S10, the Qb node may have a low-level voltage. During the second period S20, the Qb node may have a high-level voltage.

Here, the low level voltage of the Qb node may be the low-potential voltage GVSS. The high level voltage of the Qb node may be the high-potential voltage GVDD.

Referring to FIG. 13, during the first period S10, when the Qb node has a low-level voltage, the body bias voltage BBV may be a first voltage level LV1. During the second period S20, when the Qb node has a high-level voltage, the body bias voltage BBV may be the second voltage level LV2.

For example, the second voltage level LV2 of the body bias voltage BBV may correspond to the voltage level of the low-potential voltage GVSS. Here, the low-potential voltage GVSS may correspond to a low level voltage of the Qb node.

For example, the first voltage level LV1 of the body bias voltage BBV may be a voltage level lower than the second voltage level LV2. Also, the first voltage level LV1 of the body bias voltage BBV may be a voltage level lower than the low-potential voltage GVSS. Here, the low-potential voltage GVSS may correspond to a low level voltage of the Qb node.

The global low-potential voltage BVSS may be a voltage lower than the low-potential voltage GVSS.

Also, the global low-potential voltage BVSS may be a voltage level lower than the first voltage level LV1 of the body bias voltage BBV.

Figure 14:
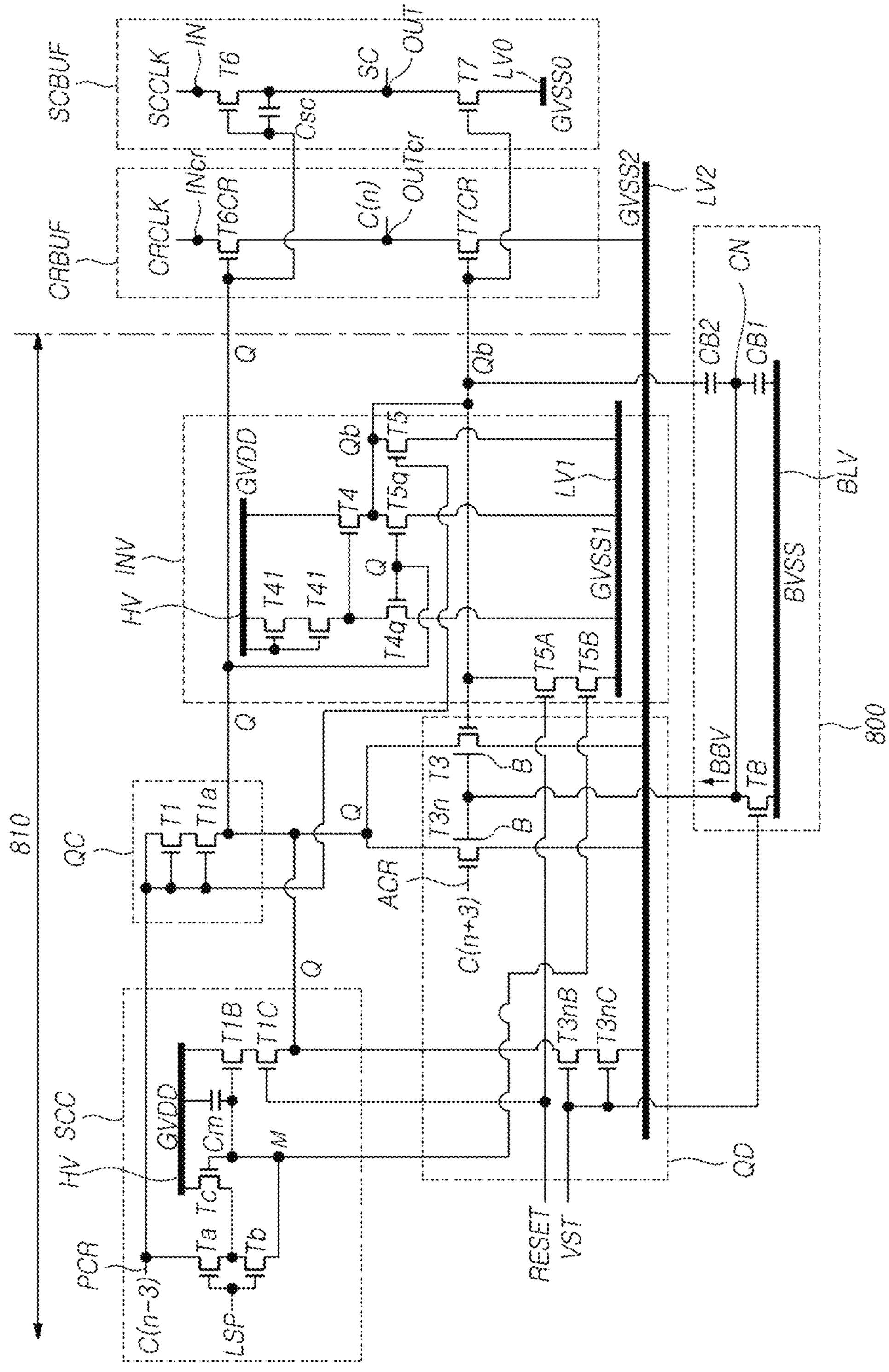
FIG. 14 is another detailed circuit diagram illustrating an nth stage circuit in a gate driving circuit according to embodiments of the disclosure.

FIG. 14 is another detailed circuit diagram of an nth stage circuit STG(n) in the gate driving circuit 130 according to embodiments of the disclosure.

Referring to FIG. 14, an nth stage circuit STG(n) included in a gate driving circuit 130 according to embodiments of the disclosure may include a scan output buffer circuit SCBUF, a carry output buffer circuit CRBUF, a control circuit 810, and a body bias circuit 800.

The low-potential voltage GVSS input to the nth stage circuit STG(n) of FIG. 14 may include a reference low-potential voltage GVSS0, a first low-potential voltage GVSS1, and a second low-potential voltage GVSS2. Accordingly, the low-potential voltage node connected to the nth stage circuit STG(n) of FIG. 14 may include a reference low-potential voltage node LV0 to which the reference low-potential voltage GVSS0 is applied, a first low-potential voltage node LV1 to which the first low-potential voltage GVSS1 is applied, and a second low-potential voltage node LV2 to which the second low-potential voltage GVSS2 is applied.

Referring to FIG. 14, the scan output buffer circuit SCBUF may receive a scan clock signal SCCLK from the scan clock node IN and may receive a reference low-potential voltage GVSS0 from the reference low-potential voltage node LV0.

The scan output buffer circuit SCBUF may be configured to output the scan signal SC including the first signal section having the turn-off level voltage Voff and the second signal section having the turn-on level voltage Von according to the voltages of the Q node and the Qb node.

Referring to FIG. 14, the carry output buffer circuit CRBUF may receive the carry clock signal CRCLK from the carry clock node INcr and may receive the second low-potential voltage GVSS2 from the second low-potential voltage node LV2. The carry output buffer circuit CRBUF may be configured to output the carry signal C(n) according to voltages of the Q node and the Qb node.

In the n-th stage circuit STG(n) of FIGS. 9 and 12, the scan signal SC may be the carry signal C(n). However, the nth stage circuit STG(n) of FIG. 14 may generate a carry signal C(n) separate from the scan signal SC. Accordingly, the nth stage circuit STG(n) of FIG. 14 may include a carry output buffer circuit CRBUF.

Referring to FIG. 14, the control circuit 810 may be configured to control voltages of the Q node and the Qb node to control the operation of the scan output buffer circuit SCBUF.

Referring to FIG. 14, the scan output buffer circuit SCBUF may include a scan pull-up transistor T6 and a scan pull-down transistor T7.

The scan pull-up transistor T6 may be turned on or off according to the voltage of the Q node to control the connection between the scan clock node IN to which the scan clock signal SCCLK is input and the scan output node OUT to which the scan signal SC is output.

A scan capacitor Csc may be connected between the gate node and the source node (or drain node) of the scan pull-up transistor T6. The gate node of the scan pull-up transistor T6 may correspond to the Q node, and the source node (or drain node) of the scan pull-up transistor T6 may correspond to the scan output node OUT.

The scan pull-down transistor T7 may be turned on or off according to the voltage of the Ob node to control the connection between the scan output node OUT and the reference low-potential voltage node LV0.

The scan pull-up transistor T6 may output the scan signal SC of the signal section having the turn-on level voltage Von at the first timing. The scan pull-down transistor T7 may output the scan signal SC of the signal section having the turn-off level voltage Voff at a second timing different from the first timing.

The first timing and the second timing may be periods included within one frame time. The first timing may be before or after the second timing, or may be both before and after the second timing.

Referring to FIG. 14, the carry output buffer circuit CRBUF may include a carry pull-up transistor T6*cr* and a carry pull-down transistor T7*cr*.

The carry pull-up transistor T6*cr* may be turned on or off according to the voltage of the Q node to control the connection between the carry clock node INcr to which the carry clock signal CRCLK is input and the carry output node OUTcr to which the carry signal CR is output.

The carry pull-down transistor T7*cr* may be turned on or off according to the voltage of the Qb node to control the connection between the carry output node OUTcr and the second low-potential voltage node LV2.

The gate node of the carry pull-up transistor T6*cr* and the gate node of the scan pull-up transistor T6 may be electrically connected to each other.

The gate node of the carry pull-down transistor T7*cr* and the gate node of the scan pull-down transistor T7 may be electrically connected to each other.

Referring to FIG. 14, the control circuit 810 may include a Q node charging circuit QC configured to charge the Q node, a Q node discharging circuit QD configured to discharge the Q node, and an inverter circuit INV configured to charge and discharge the Qb node.

Referring to FIG. 14, the Q node charging circuit QC may include at least one Q node charge transistor T1 and T1*a* that is turned on or off by a previous carry signal C(n−3) output from the previous stage circuit STG(n−3) to control the connection between the previous carry node PCR to which the previous carry signal C(n−3) is input and the Q node.

The first Q node charge transistor T1 and the second Q node charge transistor T1*a* may be connected in series between the previous carry node PCR and the Q node. The gate node of the first Q node charge transistor T1 and the gate node of the second Q node charge transistor T1*a* may be commonly connected to the previous carry node PCR. The first Q node charge transistor T1 may be in a diode connection state in which the source node (or drain node) and the gate node are connected.

The previous stage circuit STG(n−3) may be determined according to the gate driving method or the number of phases of the scan clock signal SCCLK. For example, the previous stage circuit STG(n−3) may be the (n−1)th stage circuit STG (n−1), the (n−2)th stage circuit STG (n−2), the (n−3)th stage circuit STG (n−3), or the (n−4)th stage circuit STG (n−4).

In embodiments of the disclosure, the previous stage circuit STG(n−3) is exemplified as the (n−3)th stage circuit STG (n−3). Accordingly, the previous carry signal C(n−3) is exemplified as the carry signal C(n−3) output from the (n−3)th stage circuit STG(n−3). Here, the carry signal C(n−3) output from the (n−3)th stage circuit STG (n−3) may be a scan signal SC output from the (n−3)th stage circuit STG (n−3).

Referring to FIG. 14, the Q node discharging circuit QD may further include a first Q node discharge transistor T3 and a second Q node discharge transistor T3*n*.

Each of the first Q node discharge transistor T3 and the second Q node discharge transistor T3*n* may control the connection between the Q node and the low-potential voltage node LV.

Each of the first Q node discharge transistor T3 and the second Q node discharge transistor T3*n* may be connected between the Q node and the low-potential voltage node LV. However, the first Q node discharge transistor T3 and the second Q node discharge transistor T3*n* may have different gate node connection structures.

The gate node of the first Q node discharge transistor T3 may be electrically connected to the Qb node. The gate node of the second Q node discharge transistor T3*n* may be electrically connected to the next carry node ACR.

The first Q node discharge transistor T3 may be turned on or off according to the voltage of the Q node to control the connection between the Q node and the second low-potential voltage node LV2. The second Q node discharge transistor T3*n* may be turned on or off by the next carry signal C(n+3) output from the next stage circuit STG (n+3) to control the connection between the Q node and the second low-potential voltage node LV2.

The body B of the first Q node discharge transistor T3 and the body B of the second Q node discharge transistor T3*n* may be electrically connected to each other.

The next stage circuit STG (n+3) may be determined according to the gate driving method or the number of phases of the scan clock signal SCCLK. For example, the next stage circuit STG (n+3) may be the (n+1)th stage circuit STG (n+1), the (n+2)th stage circuit STG(n+2), the (n+3)th stage circuit STG (n+3), or the (n+4)th stage circuit STG (n+4).

In embodiments of the disclosure, the next stage circuit STG (n+3) is exemplified as the (n+3)th stage circuit STG (n+3). Accordingly, the next stage circuit STG (n+3) is exemplified as the carry signal C(n+3) output from the (n+3)th stage circuit STG (n+3). Here, the carry signal C(n+3) output from the (n+3)th stage circuit STG(n+3) may be a scan signal SC output from the (n+3)th stage circuit STG (n+3).

Referring to FIG. 14, the Q node discharging circuit QD may further include a third Q node discharge transistor T3*n*B and a fourth Q node discharge transistor T3*n*C.

The third Q node discharge transistor T3*n*B and the fourth Q node discharge transistor T3*n*C may be connected in series between the Q node and the second low-potential voltage node LV2. The gate of the third Q node discharge transistor T3*n*B and the gate node of the fourth Q node discharge transistor T3*n*C may be electrically connected to each other, and may commonly receive the start signal VST.

Referring to FIG. 14, the inverter circuit INV may include a first Qb node charge transistor T4 and a first Qb node discharge transistor T5.

The first Qb node charge transistor T4 may control the connection between the high-potential voltage node HV to which the high-potential voltage GVDD is applied and the Qb node.

The first Qb node discharge transistor T5 may control the connection between the Qb node and the first low-potential voltage node LV1. The gate node of the first Qb node discharge transistor T5 may be electrically connected to the previous carry node PCR to which the previous carry signal C (n−3) is applied.

Referring to FIG. 14, the inverter circuit INV may further include a second Qb node discharge transistor T5*q* for controlling the connection between the Qb node and the first low-potential voltage node LV1.

The first Qb node discharge transistor T5 and the second Qb node discharge transistor T5*q* are transistors for controlling the connection between the Qb node and the first low-potential voltage node LV1, but the connection positions of the gate nodes may be different.

As the gate node of the first Qb node discharge transistor T5 and the gate node of the second Qb node discharge transistor T5*q* are connected to different positions, the first Qb node discharge transistor T5 and the second Qb node discharge transistor T5*q* may be turned on or off by different signals or different voltages.

The gate node of the first Qb node discharge transistor T5 may be electrically connected to the previous carry node PCR. Accordingly, the first Qb node discharge transistor T5 may be turned on or off by the previous carry signal C(n−3).

The gate node of the second Qb node discharge transistor T5*q* may be electrically connected to the Q node. Accordingly, the second Qb node discharge transistor T5*q* may be turned on or off according to the voltage of the Q node.

Referring to FIG. 14, the inverter circuit INV may further include at least one first control transistor T41 and a second control transistor T4*q*.

The at least one first control transistor T41 may be controlled according to the high-potential voltage GVDD to control connection between the gate node of the first Qb node charge transistor T4 and the high-potential voltage node HV.

When there is one first control transistor T41, the gate node of the first control transistor T41 and the drain node (or source node) of the first control transistor T41 may be connected to the high-potential voltage node HV. In other words, the first control transistor T41 may be in a diode connection state. When the number of first control transistors T41 is two, the two first control transistors T41 may be connected in series between the gate node of the first Qb node charging transistor T4 and the high potential voltage node HV. One of the two first control transistors T41 may be connected between the high potential voltage node HV and a connection point of the two first control transistors T41. The other one of the two first control transistors T41 may be connected between the connection point of the two first control transistors T41 and the gate node of the first Qb node charging transistor T4. A gate node of each of the two first control transistors T41 may be connected to the high potential voltage node HV.

The first control transistor T41 may be turned on to apply the high-potential voltage GVDD to the gate node of the first Qb node charge transistor T4. Accordingly, the first Qb node charge transistor T4 may be turned on. In other words, the first control transistor T41 may be a control transistor capable of turning the first Qb node charge transistor T4 on. While the high-potential voltage GVDD is applied to the high-potential voltage node HV, the first control transistor T41 may always be in the turn-on state, and accordingly, the first Qb node charge transistor T4 may always be in the turn-on state.

The second control transistor T4*q* may be turned on or off according to the voltage of the Q node to control the connection between the gate node of the first Qb node charge transistor T4 and the first low-potential voltage node LV1. The gate node of the second control transistor T4*q* may be electrically connected to the Q node.

When the Q node has a high-level voltage, the second control transistor T4*q* may be turned on to electrically connect the gate node of the first Qb node charge transistor T4 and the first low-potential voltage node LV1. Accordingly, the first Qb node charge transistor T4 may be turned off.

When the Q node has a low-level voltage, the second control transistor T4*q* may be turned off. Accordingly, the gate node of the first Qb node charge transistor T4 may have the high-potential voltage GVDD supplied through the first control transistor T41. Accordingly, when the first Qb node charge transistor T4 is turned on, the Qb node corresponding to the source node (or drain node) of the first Qb node charge transistor T4 may be electrically connected to the high-potential voltage node HV. Accordingly, the Qb node may be in a charging state having the high-potential voltage GVDD.

As described above, the second control transistor T4*q* may be turned on according to the high level voltage of the Q node to control the first Qb node charge transistor T4 to be turned off. Accordingly, the Qb node may be discharged.

The second control transistor T4*q* may be turned off according to the low-level voltage of the Q node to control the first Qb node charge transistor T4 to be turned on. Accordingly, the Qb node may be charged.

Referring to FIG. 14, the inverter circuit INV may include a third Qb node discharge transistor T5A and a fourth Qb node discharge transistor T5B.

The third Qb node discharge transistor TA and the fourth Qb node discharge transistor T5B may be connected in series between the Qb node and the first low-potential voltage node LV1.

A reset signal RESET may be input to the gate node of the third Qb node discharge transistor T5A. The gate node of the fourth Qb node discharge transistor T5B may be electrically connected to the intermediate node M.

Referring to FIG. 14, the control circuit 810 may further include a sensing control circuit SCC. The sensing control circuit SCC may be configured to control the voltage of the Q node such that the scan output buffer circuit SCBUF outputs the scan signal SC including the second signal section having the turn-on level voltage Von during an arbitrary blank period BLANK.

The sensing control circuit SCC may include a first sensing control transistor Ta, a second sensing control transistor Tb, and a third sensing control transistor Tc.

The first sensing control transistor Ta and the second sensing control transistor Tb may be connected in series between the previous carry input node PCR and the intermediate node M.

The previous carry signal input to the previous carry input node PCR may be the (n−3)th carry signal C(n−3) output from the (n−3)th stage circuit STG (n−3).

The first sensing control transistor Ta and the second sensing control transistor Tb may control connection between the previous carry input node PCR and the intermediate node M.

A line selection signal LSP may be commonly applied to the gate node of each of the first sensing control transistor Ta and the second sensing control transistor Tb. Here, the line selection signal LSP is a pulse-type signal and may be commonly applied to the respective gate nodes of the first and second sensing control transistors Ta and Tb in the middle of the frame.

The third sensing control transistor Tc may be connected between a point at which the first sensing control transistor Ta and the second sensing control transistor Tb are connected and the high-potential voltage node HV.

The third sensing control transistor Tc may control the connection between the connection point of the first sensing control transistor Ta and the second sensing control transistor Tb and the high-potential voltage node HV according to the voltage of the intermediate node M.

The gate node of the third sensing control transistor Tc may be electrically connected to the intermediate node M.

The sensing control circuit SCC may include a capacitor Cm connected between the high-potential voltage node HV and the intermediate node M.

The sensing control circuit SCC may further include a fourth sensing control transistor T1B and a fifth sensing control transistor TIC connected in series between the high-potential voltage node HV and the Q node.

The gate node of the fourth sensing control transistor T1B may be connected to the intermediate node M. The fourth sensing control transistor T1B may be turned on or off according to the voltage of the intermediate node M to control the connection between the high-potential voltage node HV and the Q node.

A reset signal RESET may be input to the gate node of the fifth sensing control transistor TIC. The fifth sensing control transistor TIC may be turned on or off according to the reset signal RESET to control the connection between the high-potential voltage node HV and the Q node. For example, the reset signal RESET may have the same voltage change pattern as the voltage change pattern of the intermediate node M.

The fourth sensing control transistor T1B and the fifth sensing control transistor TIC may be circuits for charging the Q node during sensing driving during the blank period BLANK.

Referring to FIG. 14, the body bias circuit 800 may be configured to supply the body bias voltage BBV to the body B of the first Q node discharge transistor T3.

The body B of the first Q node discharge transistor T3 and the body B of the second Q node discharge transistor T3*n* may be electrically connected to each other. Accordingly, the body bias voltage BBV may be applied to both the body B of the first Q node discharge transistor T3 and the body B of the second Q node discharge transistor T3*n*.

The body bias voltage BBV may be a voltage whose voltage level changes rather than a voltage having a constant voltage level.

Referring to FIG. 14, the body bias circuit 800 may include a first bias capacitor CB1 and a second bias capacitor CB2.

The first bias capacitor CB1 may be connected between the body B of the first Q node discharge transistor T3 and the global low-potential voltage node BLV to which the global low-potential voltage BVSS is applied.

The second bias capacitor CB2 may be connected between the body B of the first Q node discharge transistor T3 and the Qb node.

The first bias capacitor CB1 and the second bias capacitor CB2 may be connected in series between the global low-potential voltage node BLV and the Qb node.

The connection point CN of the first bias capacitor CB1 and the second bias capacitor CB2 may be the body B of the first Q node discharge transistor T3 or may be electrically connected to the body B of the first Q node discharge transistor T3.

For example, the second bias capacitor CB2 may have a capacitance greater than that of the first bias capacitor CB1.

Referring to FIG. 14, the body bias circuit 800 may further include a bias transistor TB connected between the body B of the first Q node discharge transistor T3 and the global low-potential voltage node BLV.

A start signal VST may be input to the gate node of the bias transistor TB. The gate node of the bias transistor TB may be electrically connected to the gate node of the third Q node discharge transistor T3_n_B and the gate node of the fourth Q node discharge transistor T3_n_C.

Through the bias transistor TB, the nth stage circuit STG(n) in the gate driving circuit 130 may perform a more stable operation. In particular, the bias transistor TB may help to provide a stable operation when power is turned on.

A body bias circuit 800 including a first bias capacitor CB1, a second bias capacitor CB2, and a bias transistor TB may be disposed on the display panel 110 or may be disposed on the source printed circuit board (SPCB) or the control printed circuit board (CPCB).

At least some of the first bias capacitor CB1, the second bias capacitor CB2, and the bias transistor TB may be disposed on the display panel 110, and the rest may be disposed on the source printed circuit board (SPCB) or the control printed circuit board (CPCB).

All or some of the transistors included in the nth stage circuit STG(n) included in the gate driving circuit 130 illustrated in FIG. 14 may be oxide semiconductor transistors. The transistors included in the nth stage circuit STG(n) may have intrinsic characteristic values such as threshold voltage and mobility. The intrinsic characteristic values of the transistors included in the nth stage circuit STG(n) may change over the driving time.

The foregoing embodiments are briefly described below.

A gate driving circuit according to embodiments of the disclosure may comprise a plurality of stage circuits for outputting a plurality of scan signals.

An nth stage circuit among the plurality of stage circuits may include a scan output buffer circuit configured to receive a scan clock signal from a scan clock node, receive a low-potential voltage from a low-potential voltage node, and output a scan signal including a first signal section having a turn-off level voltage and a second signal section having a turn-on level voltage according to voltages of a Q node and a Qb node, a control circuit including a plurality of transistors to control the voltages of the Q node and the Qb node to control an operation of the scan output buffer circuit, the plurality of transistors including a first Q node discharge transistor turned on or off by the voltage of the Qb node to control connection between the Q node and the low-potential voltage node, and a body bias circuit configured to supply a body bias voltage to a body of the first Q node discharge transistor.

A voltage level of the body bias voltage may change according to a state of the first Q node discharge transistor. During a period when the first Q node discharge transistor is to be turned off, the body bias voltage may have a first voltage level. During a period when the first Q node discharge transistor is to be turned on, the body bias voltage may have a second voltage level different from the first voltage level.

The first voltage level may be lower than the second voltage level, and the first voltage level may be lower than the low-potential voltage.

A voltage level change pattern of the body bias voltage may correspond to a voltage level change pattern of the Qb node. The body bias voltage may have a voltage level that changes according to the voltage level of the Qb node. When the Qb node has a low level voltage, the body bias voltage may have a first voltage level. When the Qb node has a high level voltage, the body bias voltage may have a second voltage level different from the first voltage level.

The body bias voltage may have a voltage level that varies depending on an operating state of the scan output buffer circuit.

When the scan signal output from the scan output buffer circuit is the second signal section having the turn-on level voltage, the body bias voltage may have a first voltage level. When the scan signal output from the scan output buffer circuit is the first signal section having the turn-off level voltage, the body bias voltage may have a second voltage level different from the first voltage level.

The body bias circuit may include a first bias capacitor connected between a body of the first Q node discharge transistor and a global low-potential voltage node to which a global low-potential voltage is applied and a second bias capacitor connected between the body of the first Q node discharge transistor and the Qb node.

The second bias capacitor may have a larger capacitance than the first bias capacitor.

The global low-potential voltage may be lower than the low-potential voltage.

The scan output buffer circuit may include a scan pull-up transistor turned on or off according to the voltage of the Q node to control connection between a scan clock node to which a scan clock signal is input and a scan output node to which the scan signal is output and a scan pull-down transistor turned on or off according to the voltage of the Qb node to control connection between the scan output node and the low-potential voltage node.

The control circuit may include a Q node charging circuit configured to charge the Q node, a Q node discharging circuit configured to discharge the Q node, and an inverter circuit configured to charge and discharge the Qb node. The first Q node discharge transistor may be included in the Q node discharge circuit.

The Q node charging circuit may include a Q node charge transistor turned on or turned off by a previous carry signal output from a previous stage circuit to control connection between a previous carry node to which the previous carry signal is input and the Q node.

The Q node discharging circuit may include the first Q node discharge transistor turned on or off according to the voltage of the Q node to control connection between the Q node and the low-potential voltage node and a second Q node discharge transistor turned on or off by a next carry signal output from a next stage circuit to control connection between the Q node and the low-potential voltage node.

The body of the first Q node discharge transistor and a body of the second Q node discharge transistor may be electrically connected to each other.

The inverter circuit may include a first Qb node charge transistor controlling connection between a high-potential voltage node to which a high-potential voltage is applied and the Qb node and a first Qb node discharge transistor controlling connection between the Qb node and the low-potential voltage node.

The inverter circuit may further include a second Qb node discharge transistor controlling connection between the Ob node and the low-potential voltage node.

The differences between the on-off methods of the first Qb node discharge transistor and the second Qb node discharge transistor are as follows. The first Qb node discharge transistor may be turned on or turned off by the previous carry signal. The second Qb node discharge transistor may be turned on or turned off according to the voltage of the Q node.

In other words, the first Qb node discharge transistor may be turned on or off by the previous carry signal to control connection between the Qb node and the low-potential voltage node. The second Qb node discharge transistor may be turned on or off according to the voltage of the Q node to control connection between the Qb node and the low-potential voltage node.

The inverter circuit may further include a first control transistor controlled according to the high-potential voltage to control connection between a gate node of the first Qb node charge transistor and the high-potential voltage node and a second control transistor turned on or off according to the voltage of the Q node to control connection between the gate node of the first Qb node charge transistor and the low-potential voltage node.

The control circuit may further include a sensing control circuit controlling the voltage of the Q node so that the scan output buffer circuit outputs the scan signal including the second signal section having the turn-on level voltage during an arbitrary blank period.

A display device according to embodiments of the disclosure may comprise a substrate, a plurality of subpixels disposed on the substrate, a plurality of scan signal lines connected to the plurality of subpixels, and a gate driving circuit connected to the plurality of scan signal lines.

The gate driving circuit may include a plurality of stage circuits.

An nth stage circuit among the plurality of stage circuits may include a scan output buffer circuit configured to receive a scan clock signal from a scan clock node, receive a low-potential voltage from a low-potential voltage node, and output a scan signal including a first signal section having a turn-off level voltage and a second signal section having a turn-on level voltage according to voltages of a Q node and a Qb node, a control circuit including a plurality of transistors to control the voltages of the Q node and the Qb node to control an operation of the scan output buffer circuit, the plurality of transistors including a first Q node discharge transistor turned on or off by the voltage of the Qb node to control connection between the Q node and the low-potential voltage node, and a body bias circuit configured to supply a body bias voltage to a body of the first Q node discharge transistor.

A voltage level of the body bias voltage may change according to a state of the first Q node discharge transistor.

The body bias voltage may change according to the voltage level of the Qb node. A voltage level change pattern of the body bias voltage may correspond to a voltage level change pattern of the Qb node.

According to embodiments of the disclosure described above, there may be provided a gate driving circuit and a display device having a simplified structure.

Embodiments of the disclosure may provide a gate driving circuit and a display device capable of operating normally by blocking a leakage current of a transistor (e.g., the first Q node discharge transistor T3 or the second Q node discharge transistor T3*n*) even when a threshold voltage of the transistor (e.g., the first Q node discharge transistor T3 or the second Q node discharge transistor T3*n*) included in the gate driving circuit is changed in a negative direction.

Embodiments of the disclosure may provide a gate driving circuit and a display device capable of generating and outputting a normal scan signal even when characteristics (e.g., threshold voltage, etc.) of a transistor (e.g., the first Q node discharge transistor T3 or the second Q node discharge transistor T3*n*, etc.) included in a gate driving circuit are changed.

It will be apparent to those skilled in the art that various modifications and variations can be made in the gate driving circuit and the display device of the present disclosure without departing from the technical idea or scope of the disclosure. Thus, it is intended that the present disclosure cover the modifications and variations of this disclosure provided they come within the scope of the appended claims and their equivalents.

What is claimed:

1. A gate driving circuit, comprising:

a plurality of stage circuits configured to output a plurality of scan signals, an nth stage circuit among the plurality of stage circuits including:

a scan output buffer circuit configured to receive a scan clock signal from a scan clock node, receive a low-potential voltage from a low-potential voltage node, and output a scan signal including a first signal section having a turn-off level voltage and a second signal section having a turn-on level voltage according to voltages of a Q node and a Qb node;

a control circuit including a plurality of transistors to control the voltages of the Q node and the Qb node to control an operation of the scan output buffer circuit, the plurality of transistors including a first Q node discharge transistor turned on or off by the voltage of the Qb node to control connection between the Q node and the low-potential voltage node; and a body bias circuit configured to supply a body bias voltage to a body of the first Q node discharge transistor.

2. The gate driving circuit of claim 1, wherein a voltage level of the body bias voltage changes according to a state of the first Q node discharge transistor.

3. The gate driving circuit of claim 2, wherein during a period when the first Q node discharge transistor is to be turned off, the body bias voltage has a first voltage level, and during a period when the first Q node discharge transistor is to be turned on, the body bias voltage has a second voltage level different from the first voltage level.

4. The gate driving circuit of claim 3, wherein the first voltage level is lower than the second voltage level, and the first voltage level is lower than the low-potential voltage.

5. The gate driving circuit of claim 1, wherein a voltage level change pattern of the body bias voltage corresponds to a voltage level change pattern of the Qb node.

6. The gate driving circuit of claim 5, wherein when the Qb node has a low level voltage, the body bias voltage has a first voltage level, and when the Qb node has a high level voltage, the body bias voltage has a second voltage level higher than the first voltage level.

7. The gate driving circuit of claim 1, wherein the body bias voltage has a voltage level that varies depending on an operating state of the scan output buffer circuit.

8. The gate driving circuit of claim 7, wherein when the scan signal output from the scan output buffer circuit is the second signal section having the turn-on level voltage, the body bias voltage has a first voltage level, and when the scan signal output from the scan output buffer circuit is the first signal section having the turn-off level voltage, the body bias voltage has a second voltage level different from the first voltage level.

9. The gate driving circuit of claim 1, wherein the body bias circuit includes:

a first bias capacitor connected between a body of the first Q node discharge transistor and a global low-potential voltage node to which a global low-potential voltage is applied; and a second bias capacitor connected between the body of the first Q node discharge transistor and the Qb node.

10. The gate driving circuit of claim 9, wherein the second bias capacitor has a larger capacitance than the first bias capacitor.

11. The gate driving circuit of claim 9, wherein the global low-potential voltage is lower than the low-potential voltage.

12. The gate driving circuit of claim 1, wherein the scan output buffer circuit includes:

a scan pull-up transistor turned on or off according to the voltage of the Q node to control connection between a scan clock node to which a scan clock signal is input and a scan output node to which the scan signal is output; and a scan pull-down transistor turned on or off according to the voltage of the Qb node to control connection between the scan output node and the low-potential voltage node, wherein the control circuit includes:

a Q node charging circuit configured to charge the Q node;

a Q node discharging circuit configured to discharge the Q node; and an inverter circuit configured to charge and discharge the Qb node, and wherein the first Q node discharge transistor is included in the Q node discharge circuit.

13. The gate driving circuit of claim 12, wherein the Q node charging circuit includes a Q node charge transistor turned on or turned off by a previous carry signal output from a previous stage circuit to control connection between a previous carry node to which the previous carry signal is input and the Q node, wherein the Q node discharging circuit includes:

the first Q node discharge transistor turned on or off according to the voltage of the Q node to control connection between the Q node and the low-potential voltage node; and a second Q node discharge transistor turned on or off by a next carry signal output from a next stage circuit to control connection between the Q node and the low-potential voltage node, and wherein the body of the first Q node discharge transistor and a body of the second Q node discharge transistor are electrically connected to each other.

14. The gate driving circuit of claim 12, wherein the inverter circuit includes:

a first Qb node charge transistor controlling connection between a high-potential voltage node to which a high-potential voltage is applied and the Qb node; and a first Qb node discharge transistor controlling connection between the Qb node and the low-potential voltage node.

15. The gate driving circuit of claim 14, wherein the inverter circuit further includes a second Qb node discharge transistor controlling connection between the Qb node and the low-potential voltage node, and wherein the first Qb node discharge transistor is turned on or off by the previous carry signal, and the second Qb node discharge transistor is turned on or off according to the voltage of the Q node.

16. The gate driving circuit of claim 15, wherein the inverter circuit further includes:

a first control transistor controlled according to the high-potential voltage to control connection between a gate node of the first Qb node charge transistor and the high-potential voltage node; and a second control transistor turned on or off according to the voltage of the Q node to control connection between the gate node of the first Qb node charge transistor and the low-potential voltage node.

17. The gate driving circuit of claim 12, wherein the control circuit further includes a sensing control circuit controlling the voltage of the Q node so that the scan output buffer circuit outputs the scan signal including the second signal section having the turn-on level voltage during an arbitrary blank period.

18. A display device, comprising:

a substrate;

a plurality of subpixels disposed on the substrate;

a plurality of scan signal lines connected to the plurality of subpixels; and a gate driving circuit connected to the plurality of scan signal lines, wherein the gate driving circuit includes a plurality of stage circuits, and wherein an nth stage circuit among the plurality of stage circuits includes:

a scan output buffer circuit configured to receive a scan clock signal from a scan clock node, receive a low-potential voltage from a low-potential voltage node, and output a scan signal including a first signal section having a turn-off level voltage and a second signal section having a turn-on level voltage according to voltages of a Q node and a Qb node;

a control circuit including a plurality of transistors to control the voltages of the Q node and the Qb node to control an operation of the scan output buffer circuit, the plurality of transistors including a first Q node discharge transistor turned on or off by the voltage of the Qb node to control connection between the Q node and the low-potential voltage node; and a body bias circuit configured to supply a body bias voltage to a body of the first Q node discharge transistor.

19. The display device of claim 18, wherein a voltage level of the body bias voltage changes according to a state of the first Q node discharge transistor.

20. The display device of claim 18, wherein the body bias voltage has a voltage level that changes according to the voltage level of the Ob node.

* * * * *